| (12) | United States Patent | (10) Patent No.: | US 9,828,046 B2 |
|---|---|---|---|
| | Hellholm | (45) Date of Patent: | Nov. 28, 2017 |

(54) ARTICULATED VEHICLE

(71) Applicant: BAE Systems Hägglunds Aktiebolag, Örnsköldsvik (SE)

(72) Inventor: Björn Hellholm, Arnäsvall (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 33 days.

(21) Appl. No.: 14/891,853

(22) PCT Filed: Apr. 25, 2014

(86) PCT No.: PCT/SE2014/050503
§ 371 (c)(1),
(2) Date: Nov. 17, 2015

(87) PCT Pub. No.: WO2014/189432
PCT Pub. Date: Nov. 27, 2014

(65) Prior Publication Data
US 2016/0083027 A1    Mar. 24, 2016

(30) Foreign Application Priority Data

May 20, 2013  (SE) ..................................... 1350614

(51) Int. Cl.
*B62D 55/065*     (2006.01)
*B62D 11/20*      (2006.01)
(Continued)

(52) U.S. Cl.
CPC ........... *B62D 55/0655* (2013.01); *B60D 5/00* (2013.01); *B60P 3/41* (2013.01); *B62D 7/026* (2013.01);
(Continued)

(58) Field of Classification Search
CPC .... B62D 55/0655; B62D 11/20; B62D 12/00; B62D 53/005
See application file for complete search history.

(56) References Cited

U.S. PATENT DOCUMENTS 2,902,293 A * 9/1959 Felburn .................. B62D 13/06
                                                    280/404
3,419,097 A * 12/1968 Nodwell ................ B60K 17/34
                                                    180/9.46
(Continued)

FOREIGN PATENT DOCUMENTS

| FR | 2347254 A1 | 11/1977 |
|---|---|---|
| SE | 467965 B | 10/1992 |

OTHER PUBLICATIONS

International Preliminary Report on Patentability received for PCT Patent Application No. PCT/SE2014/050503, dated Dec. 3, 2015, 8 pages.

(Continued)

*Primary Examiner* — Kevin Hurley
*Assistant Examiner* — Gabriela C Craciun
(74) *Attorney, Agent, or Firm* — Morrison & Foerster LLP

(57) ABSTRACT

The invention relates to an articulated vehicle comprising a front and a rear vehicle unit, and at least one further vehicle unit connected to said rear vehicle unit, comprising a front vertical steering link arranged substantially centrally of the front vehicle unit, where said front vertical steering link is configured for pivotal attachment to a fixed load-carrying frame connecting said front and rear vehicle units, where said at least one further vehicle unit is configured for attachment to a further fixed load-carrying frame, where said further fixed load-carrying frame is releasably connectable to said fixed load-carrying frame for said connection, such that a train of vehicle units is formed connected to a (Continued)

load-carrying frame unit comprising said fixed load-carrying frame and said further fixed load-carrying frame.

17 Claims, 7 Drawing Sheets

(51) Int. Cl.
  *B62D 7/02*   (2006.01)
  *B62D 12/02*   (2006.01)
  *B60P 3/41*   (2006.01)
  *B60D 5/00*   (2006.01)
  *B60D 1/00*   (2006.01)

(52) U.S. Cl.
  CPC .............. *B62D 11/20* (2013.01); *B62D 12/02* (2013.01); *B60D 2001/008* (2013.01)

(56) References Cited

U.S. PATENT DOCUMENTS

| | | | | |
|---|---|---|---|---|
| 4,072,203 A * | 2/1978 | Pierson | ............... | B60F 5/003 180/9.44 |
| 4,470,475 A * | 9/1984 | Carlson | ............... | B62D 53/005 180/22 |
| 4,579,182 A * | 4/1986 | Dewing | ............... | B62D 11/20 180/9.46 |
| 4,741,549 A * | 5/1988 | Gevers | ............... | B62D 53/005 280/407.1 |
| 4,966,242 A * | 10/1990 | Baillargeon | ....... | B62D 55/0655 180/242 |
| 5,081,933 A * | 1/1992 | Lapp | ............... | B61F 5/44 105/168 |
| 5,113,958 A * | 5/1992 | Holden | ............... | B62D 11/20 180/9.1 |
| 5,632,350 A * | 5/1997 | Gauvin | ............... | B60D 1/00 180/14.4 |
| 6,164,399 A * | 12/2000 | Bays | ............... | B62D 55/0655 180/9.21 |
| 6,299,181 B1 | 10/2001 | Ericksson | | |
| 6,450,523 B1 * | 9/2002 | Masters | ............... | B62D 13/005 280/423.1 |
| 8,991,528 B2 * | 3/2015 | Hellholm | ............... | B60K 6/46 180/14.2 |
| 2002/0195795 A1 | 12/2002 | Brown | | |
| 2010/0206648 A1 * | 8/2010 | Kelppe | ............... | B62D 55/04 180/9.1 |
| 2013/0068544 A1 * | 3/2013 | Itou | ............... | B62D 11/003 180/6.5 |
| 2015/0125252 A1 * | 5/2015 | Berzen Ratzel | ....... | B62D 12/02 414/800 |
| 2016/0083026 A1 * | 3/2016 | Hellholm | ............... | B60D 5/00 180/9.44 |

OTHER PUBLICATIONS

International Search Report and Written Opinion received for PCT Patent Application No. PCT/SE2014/050503, dated Aug. 21, 2014, 11 pages.

* cited by examiner

ARTICULATED VEHICLE

CROSS REFERENCE TO RELATED APPLICATIONS

This application is a U.S. National Stage patent application of PCT/SE2014/050503, filed on Apr. 25, 2014, which claims priority to Swedish Patent Application No. 1350614-2, filed on May 20, 2013, the entire contents of which are incorporated herein by reference.

FIELD OF THE INVENTION

The present invention relates to an articulated vehicle.

BACKGROUND OF THE INVENTION

Track driven/tracked and wheeled articulated vehicles for transportation of load, such as forestry, typically consists of two vehicle units in the form of a rear and a front vehicle unit, where the front and rear vehicle units are connected via an articulated link section, as well as at least one further vehicle unit connected to the rear vehicle unit, forming a so-called train of vehicle units so as to facilitate the transportation of bulky heavy goods. Transportation of load by such vehicles, load capacity and manoeuvrability of such vehicles has limitations.

Hence, there is a need to introduce improvements of articulated vehicles for transportation of bulky heavy goods.

SUMMARY OF THE INVENTION

An object of the present invention is to provide an articulated vehicle which gives rise to good load distribution and good and flexible load capacity.

A further object of the present invention is to provide an articulated vehicle which admits good manoeuvrability of the vehicle.

These and other objects, which will become apparent from the following description, are achieved by means of an articulated vehicle of the type mentioned in the introduction and which further exhibits the features indicated below. Preferred embodiments of the articulated vehicle are defined below.

According to the invention, the objects are obtained by an articulated vehicle comprising a front and a rear vehicle unit, and at least one further vehicle unit connected to said rear vehicle unit, comprising a front vertical steering link arranged substantially centrally of the front vehicle unit, where said front vertical steering link is configured for pivotal attachment to a fixed load-carrying frame connecting said front and rear vehicle units, where said at least one further vehicle unit is configured for attachment to a further fixed load-carrying frame, where said further fixed load-carrying frame is releasably connectable to said fixed load-carrying frame for said connection, such that a train of vehicle units is formed connected to a load-carrying frame unit comprising said fixed load-carrying frame and said further fixed load-carrying frame. This enables good load distribution and good and flexible load capacity. Hence, the vehicle enables great flexibility with regard to transportation of load in the form of objects/goods of varying length. This facilitates pivoting of said front vehicle unit relative to the load-carrying frame/load-carrying frame unit and said rear and further vehicle units, wherein the manoeuvrability of the vehicle is improved. Furthermore, the force generated by the load will act centrally on the front vehicle unit, wherein the pressure from track assemblies of the front vehicle unit on the ground, i.e. the ground pressure, will be evenly distributed over the contact surface between the ground and the endless tracks of the track assemblies. This gives rise to an even and low ground pressure which is advantageous since ground damages hereby are efficiently minimized.

In an embodiment of said articulated vehicle, said load-carrying frame is connected via a rear portion to a front portion of said further load-carrying frame. This enables simple and efficient connection and removal of a further vehicle unit for adaption to the load demand.

In an embodiment of said articulated vehicle, said front vertical steering link is arranged to enable pivoting of said front vehicle unit relative to said load-carrying frame, said rear vehicle unit and said further first vehicle unit about an axis of the front vertical steering link. This facilitates the pivoting of said front vehicle unit relative to the load-carrying frame/the load-carrying frame unit and said rear and further vehicle units, wherein the manoeuvrability of the vehicle is improved.

In an embodiment of said articulated vehicle, the load-carrying frame is configured for pivotal attachment to a rear vertical steering link arranged centrally of said rear vehicle unit to enable pivoting of said rear vehicle unit relative to said load-carrying frame, said front vehicle unit and said further vehicle unit about an axis of the rear vertical steering link. This facilitates the pivoting of said rear vehicle unit relative to the load-carrying frame, the further load-carrying frame, the front vehicle unit and the further vehicle unit, wherein the manoeuvrability of the vehicle is further improved. Furthermore, the force generated by the load will act centrally on the rear vehicle unit, whereby the pressure from track assemblies of the rear vehicle unit on the ground, i.e. the ground pressure, will be evenly distributed over the contact surface between the ground and the endless tracks of the track assemblies. This gives rise to an even and low ground pressure which is advantageous since ground damages hereby are efficiently minimized.

In an embodiment of said articulated vehicle, the further load-carrying frame is configured for pivotal attachment to a further vertical steering link arranged centrally of said further vehicle unit to enable pivoting of said further vehicle unit relative to said load-carrying frame and said front and rear vehicle units. This facilitates the pivoting of said further vehicle unit relative to the load-carrying frame, the further load-carrying frame, the front vehicle unit and the rear vehicle unit, wherein the manoeuvrability of the vehicle is further improved. Furthermore, the load generated by the force will act centrally on the further vehicle unit, whereby the pressure from further track assemblies of the vehicle unit on the ground, i.e. ground pressure, will be evenly distributed over the contact surface between the ground and the endless tracks of the track assemblies. This gives rise to an even and low ground pressure which is advantageous since ground damages hereby are efficiently minimized.

In an embodiment of said articulated vehicle, the load-carrying frame is configured for rotatable attachment to a rolling link arranged at said front vehicle unit to enable rotation of said front vehicle unit relative to said load-carrying frame, said further load-carrying frame, said rear vehicle unit and said further vehicle unit about the axis of said rolling link running in the axial main extension direction of the frame unit. This facilitates the rotation of said front vehicle unit relative to the load-carrying frame about the axis in the main extension direction of the load-carrying frame, wherein the manoeuvrability of the vehicle and the ability of the vehicle to follow the ground is further improved.

In an embodiment of said articulated vehicle, the load-carrying frame is configured for pivotal attachment to said further load-carrying frame via a frame rolling link comprising said connection to enable pivoting of said load-carrying frame and said further load-carrying frame relative to each other about the axis of said frame rolling link running in the axial main extension direction of the frame unit. This facilitates the rotation of said further load-carrying frame relative to the load-carrying frame and hence said further vehicle unit relative to the rear vehicle unit and the front vehicle unit about the axis in the main extension direction of the load-carrying frame unit, the manoeuvrability of the vehicle and the ability of the vehicle to follow the ground is further improved.

In an embodiment of said articulated vehicle, the load-carrying frame unit, in a basic position of the vehicle where the longitudinal extension of the front, the rear and said at least one further vehicle unit are substantially aligned with each other, is arranged to run over a rear section of the front vehicle unit and to run substantially over the rear vehicle unit and the further vehicle unit, such that the weight of the load carried by the load-carrying frame is carried centrally of the respective vehicle unit. Thus, by distributing the load evenly over the vehicle, the track assemblies of the front of the vehicle unit, the track assemblies of the rear vehicle unit and the track assemblies of the further vehicle unit of the tracked vehicle are loaded to the same extent, which results in that the track assemblies for the front vehicle unit, the rear vehicle unit, and the further vehicle unit may be sized equally. This results in that track assemblies of the same kind can be used for the respective vehicle unit, and so vehicle units of the same kind comprising centre beams/chassis beams of the same kind and suspension configuration of the same kind for suspension and resilient suspension of the track assemblies, thus reducing the number of vehicle components and hence reducing the cost of construction, spare part stock and maintenance.

In an embodiment of said articulated vehicle, said connection between said further load-carrying frame and said load-carrying frame is fixed in vertical link, such that said first and further load-carrying frames are not allowed to pivot relative to each other about said vertical link. This improves the load capacity of the vehicle in that the load-carrying frame unit supporting the load becomes more stable.

In an embodiment of said articulated vehicle, said connection between said further load-carrying frame and said load-carrying frame is fixed in tipping link, such that said first and further load-carrying frames are not allowed to pivot relative to each other about said tipping link. This improves the load capacity of the vehicle in that the load-carrying frame unit supporting the load becomes more stable.

In an embodiment of said articulated vehicle, the load-carrying frame is configured for pivotal attachment to said further load-carrying frame via a vertical steering link comprising said connection to enable pivoting of said load-carrying frame and said further load-carrying frame relative to each other about the axis of said vertical steering link. This allows improved manoeuvrability of the vehicle.

In an embodiment of said articulated vehicle, the load-carrying frame is configured for pivotal attachment to said further load-carrying frame via a tipping steering link comprising said connection to enable pivoting of said load-carrying frame and said further load-carrying frame relative to each other about the axis of said tipping steering link. This allows improved manoeuvrability of the vehicle.

In an embodiment of said articulated vehicle, said train of vehicle units comprises one or more further vehicle units following one another. This enables good and flexible load capacity for load/goods of various lengths.

In an embodiment of said articulated vehicle, respective further load-carrying frame, connected to a further vehicle unit, is configured in the front end to be connected to a rear end of the load-carrying frame of the preceding vehicle unit and in the rear end to a front end of a further load-carrying frame of the succeeding vehicle unit. This enables simple connection and removal of the further vehicle unit at the rear vehicle unit, and at another further vehicle unit.

In an embodiment of said articulated tracked vehicle, the front vehicle unit comprises a front track assembly pair, wherein the front vertical steering link is arranged between the respective track assemblies of the front track assembly pair and substantially centrally arranged relative to the longitudinal extension of the front track assembly pair, such that the weight of the load carried by the load-carrying frame is distributed to be carried centrally of said track assembly pair of said front vehicle unit; and wherein the rear vehicle unit comprises a rear track assembly pair, wherein the rear vertical steering link is arranged between the respective track assemblies of the rear track assembly pair and substantially centrally arranged relative to the longitudinal extension of the rear track assembly pair, such that the weight of the load carried by the load-carrying frame is distributed to be carried centrally of said track assembly pair of said rear vehicle unit; and wherein respective further vehicle unit comprises a further track assembly pair, wherein the respective further vertical steering link is arranged between the respective track assemblies of the further track assembly pair and substantially centrally arranged relative to the longitudinal extension of the further track assembly pair, such that the weight of the load carried by the respective further load-carrying frame is distributed to be carried centrally of said track assembly pair of the respective further vehicle unit. Thus, by distributing the load evenly over the vehicle, the track assemblies of the front of the vehicle unit, the track assemblies of the rear vehicle unit and the track assemblies of the further vehicle unit of the tracked vehicle are loaded to the same extent, which results in that the track assemblies for the front vehicle unit, the rear vehicle unit, and the further vehicle unit may be sized equally. This results in that track assemblies of the same kind can be used for the respective vehicle unit, and so vehicle units of the same kind comprising centre beams/chassis beams of the same kind and suspension configuration of the same kind for suspension and resilient suspension of the track assemblies, thus reducing the number of vehicle components and hence reducing the cost of construction, spare part stock and maintenance.

In an embodiment of said articulated vehicle, the further load-carrying frame of a further vehicle unit, in a basic position where the further load-carrying frame runs in the longitudinal extension of the further vehicle unit, is arranged to, by a front portion, protrude beyond the front end of its track assembly pair and to, by a rear portion, protrude beyond the rear end of the track assembly pair. This enables simple connection and removal of the further vehicle unit at the rear vehicle unit, and at other further vehicle unit.

The articulated tracked vehicle, according to any preceding embodiment, where said articulated vehicle is a diesel electric vehicle.

BRIEF DESCRIPTION OF THE DRAWINGS

The present invention will be better understood by reference to the following detailed description together with the accompanying drawings, where equal reference numerals refer to the same parts throughout the several views, and in which:

FIG. 5b schematically illustrates a side perspective view of the vehicle unit in FIG. 5a;

FIG. 8b schematically illustrates a top view of the steering device of FIG. 8a;

FIG. 9b schematically illustrates a top view of the steering device of FIG. 8a;

DETAILED DESCRIPTION OF THE INVENTION

Herein, the term "track support beam" refers to a structural member arranged to support ground-engaging means such as e.g. an endless track as well as drive wheel(s) and support wheels.

Herein, the term "track assembly" refers to a unit of the tracked vehicle comprising track support beam, drive wheel(s) and support wheels as well as a circumferential endless track, which unit is arranged to comprise ground-engaging means and configured to propel the vehicle and hence forms at least part of a drive unit of the tracked vehicle.

Herein, the term "track assembly pair" refers to opposite track assemblies of a vehicle unit of the vehicle, one track assembly constituting a right track assembly and the opposite track assembly constituting a left track assembly.

Herein, the term "articulated vehicle" refers to a vehicle with at least a front vehicle unit and a rear vehicle unit which are pivotable relative to each other about at least one link.

Herein, the term "centrally of the vehicle unit" refers to an area of the vehicle unit which may be located substantially centrally relative to the longitudinal and lateral extensions of the vehicle unit. The term "centrally of the vehicle unit" refers to an area of the tracked vehicle between track assemblies of the track assembly pair and inside the longitudinal extension of the track assemblies, preferably an area substantially halfway between the front end and the rear end of the track assembly.

Herein, the term "centrally of the track assembly pair" refers to an area of the vehicle unit centrally arranged between the track assemblies of the track assembly pair and centrally in the longitudinal direction of the track assembly pair.

Herein the term "train of vehicle units" refers to an articulated vehicle comprising a front vehicle unit and a rear vehicle unit, as well as one or more further vehicle units following one another.

Herein, the term "vertical link" refers to a link running substantially orthogonal to the axial main extension direction of a vehicle unit and substantially orthogonal to the lateral extension direction of the vehicle unit.

Herein the term "fixed in vertical link" refers to that connected load-carrying frames are not allowed to pivot relative to each other about a vertical link, nor at the connection between the load-carrying frames.

Herein, the term "tilting link" refers to a link that runs substantially orthogonal to a vehicle unit axial main extension direction and substantially parallel with the lateral extension direction of the vehicle unit.

Herein the term "fixed in tilting" refers to that connected load-carrying frames are not allowed to pivot relative to each other about a tilting link, nor at the connection between the load-carrying frames.

Figure 1:
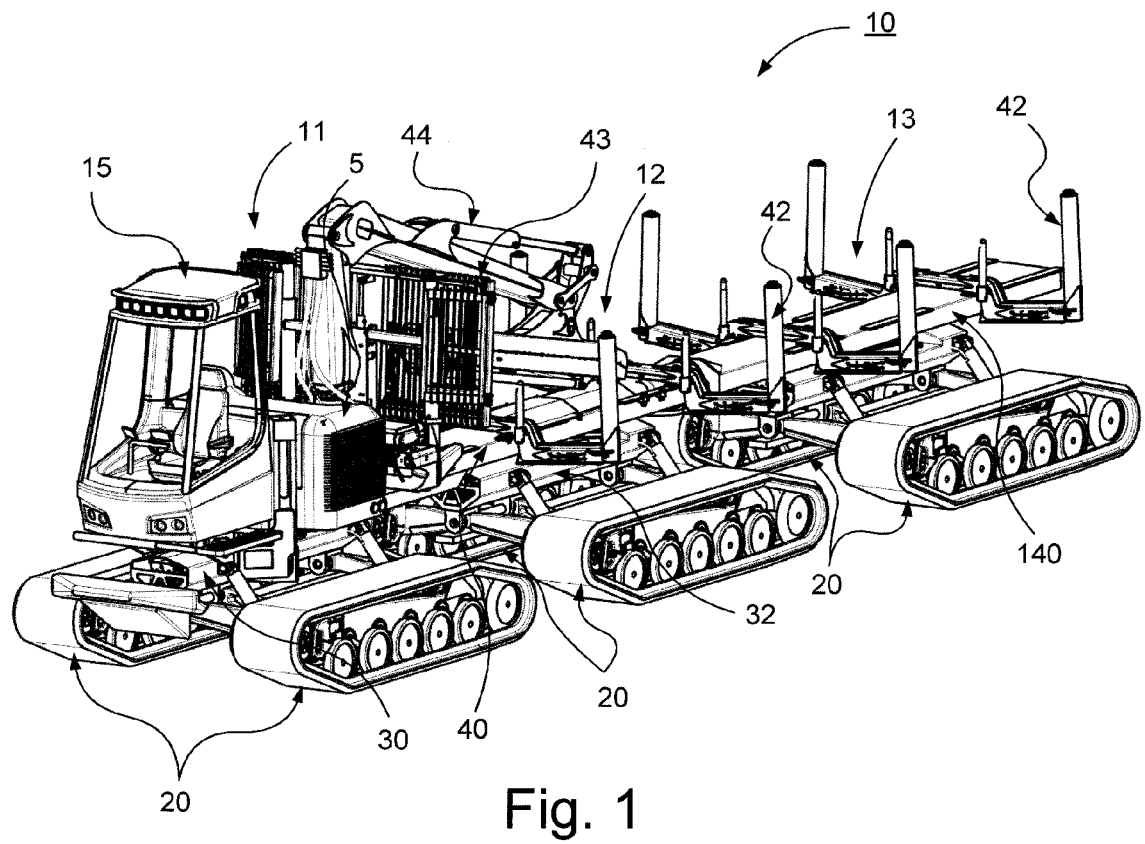
FIG. 1 schematically illustrates a perspective view of an articulated tracked vehicle comprising a front vehicle unit and a rear vehicle unit as well as a further vehicle unit connected to the rear vehicle unit forming a train of vehicle units according to the present invention.
Figure 2:
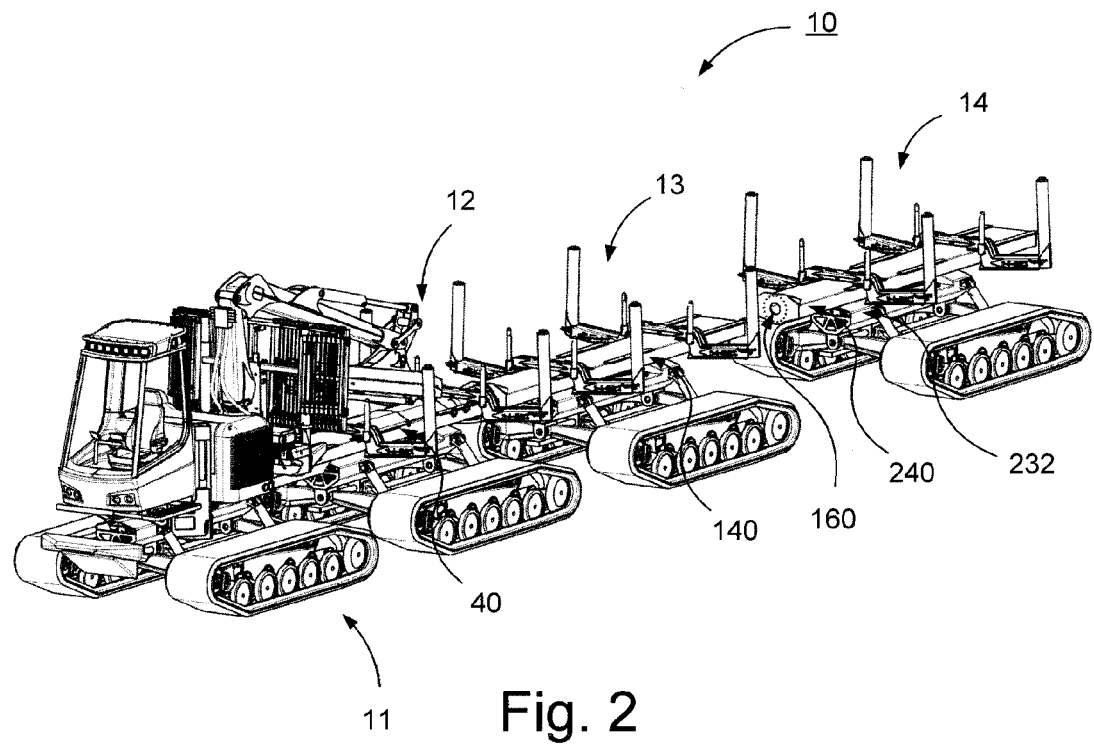
FIG. 2 schematically illustrates a perspective view of the vehicle of FIG. 1 having a further vehicle unit connectable to the vehicle.
Figure 3:
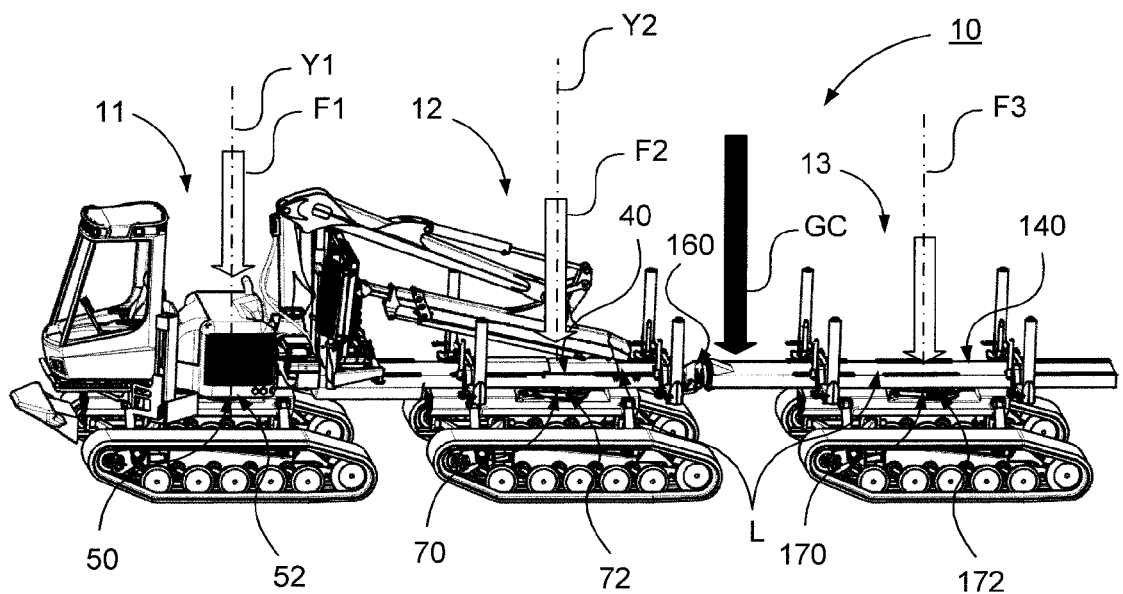
FIG. 3 schematically illustrates a side perspective view of the vehicle of FIG. 1.

Referring to FIG. 1, a perspective view of a tracked vehicle 10 according to the present invention is shown, the tracked vehicle 10 being provided with a front vehicle unit 11 and a rear vehicle unit 12 as well as a further vehicle unit 13 connected to said rear vehicle unit 12 thus forming a train of vehicle units. FIG. 2 schematically shows a perspective view of the vehicle of FIG. 1 having a further vehicle unit 14 connectable to the vehicle and FIG. 3 schematically illustrates a side perspective view of the vehicle of FIG. 1.

Hence, reference numeral 10 illustrates an articulated vehicle 10, formed as a train of vehicle units, having a front and a rear vehicle unit 11, 12 as well as one or more further vehicle units 13, 14 following one another and connected to a preceding vehicle unit 12, 13.

Each of the front, rear and further vehicle units 11, 12, 13 comprises a track assembly pair 20. Said track assembly pair 20 is constituted by or comprised of a drive unit pair. Said track assembly pair 20 comprises two track assemblies 21 arranged on opposite sides of the vehicle. The respective track assembly 21 is constituted by or comprised of a drive unit. The respective track assembly 21 is constituted by a driving track assembly and is arranged for propulsion of the vehicle. The respective track assembly pair 20 is connected to an intermediate centre beam 30, 32, 132, 232 such as a chassis beam.

Said centre beam 30, 32, 132, 232 of the respective vehicle unit 11, 12, 13, 14 is arranged for support of vehicle structure, e.g. in the form of vehicle cabin, power supply, load-carrying structure and crane.

In this configuration of the vehicle 10, the centre beam 30 of the front vehicle unit 11 is arranged to support a vehicle cabin 15 and a power supply 5, such as a combustion engine, where the combustion engine, in an alternative, is constituted by a diesel engine.

In this configuration of the vehicle 10, the centre beams 30, 32 of the front and rear vehicle units 11, 12 are further arranged to support a load-carrying structure comprising a load-carrying frame 40, where said load-carrying frame 40, in this alternative, is configured to support a U-beam configuration 42 or a load bank configuration 42 for supporting timber as well as a loading gate 43. The load-carrying frame is, in this alternative, also arranged to support a crane 44 for loading/unloading timber or other load. The load-carrying frame 40 is configured to distribute the load substantially centrally over the front and the rear vehicle units 11, 12.

In this configuration of the vehicle 10, also the centre beam 132 of the further vehicle unit 13 is arranged to support a load-carrying structure comprising a further load-carrying frame 140, where said load-carrying frame 140, in this alternative, is configured to support a U-beam configuration 42 or a load bank configuration 42.

In this configuration of the vehicle 10, also the centre beam 232 of the further vehicle unit 14 is arranged to support a load-carrying structure comprising a further load-carrying frame 240, where said load-carrying frame 240, in this alternative, is configured to support a U-beam configuration 42 or a load bank configuration 42.

Here, the front and rear vehicle units 11, 12 of the exemplified vehicle 10 are constituted by a tracked forestry vehicle in the form of a forwarder intended to transport the timber from a harvesting site to a loading site. The vehicle 10 of the present invention may be constituted by any suitable type of tracked vehicle and may, with one or more further vehicle units 13, 14 connected to the front and rear vehicle units 11, 12 via further load-carrying frame, carry load in the form of longer goods where the vehicle may be adapted to the length of the load by the number of connected further vehicle units 13, 14.

The exemplified vehicle 10 is a diesel-electric driven vehicle. In an alternative, the vehicle 10 may have any suitable power supply for the propulsion of the vehicle. In an alternative, the vehicle 10 is a hybrid-driven vehicle. In an alternative, the vehicle 10 is an electrically driven vehicle, where the power is supplied by means of an energy storage device such as a battery unit, a fuel cell or a capacitor unit.

Figure 4:
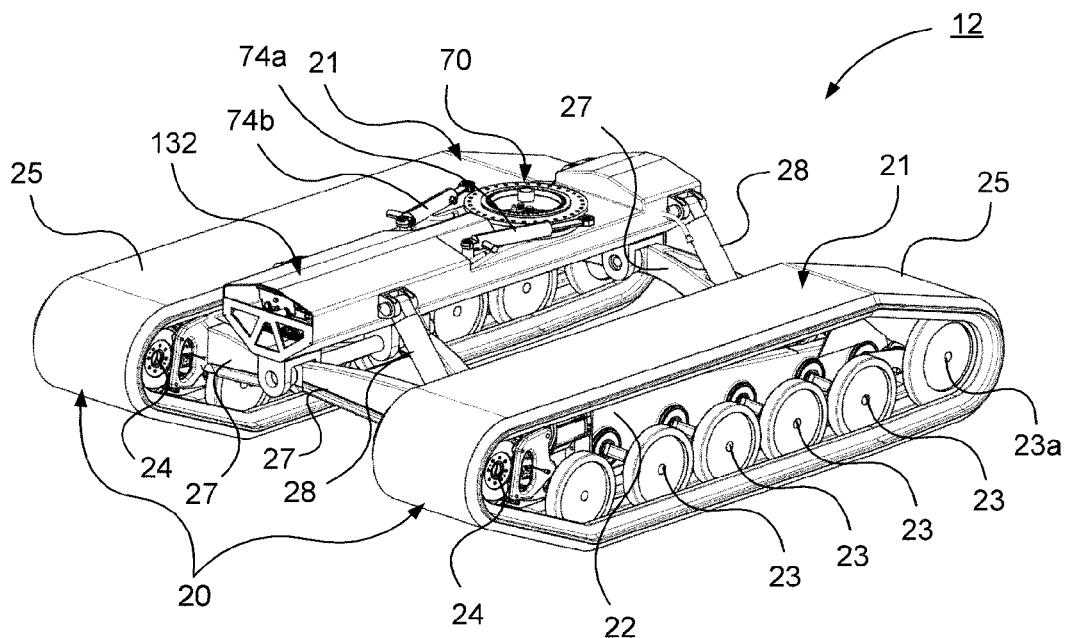
FIG. 4 schematically illustrates a perspective view of a vehicle unit of the vehicle of FIG. 1 in an embodiment of the present invention.

Referring to FIG. 4, a rear vehicle unit 12 comprising a track assembly pair 20 connected to an intermediate centre beam 32 is shown.

In more detail, a rear vehicle unit 12 is shown, with reference to FIG. 2, having a track assembly pair 20 and having a centre beam connected to and configured for suspension of the centre beam 32.

The respective track assembly 21 is arranged for driving the vehicle unit 12. The respective track assembly 21 comprises a track support beam 22, which here is constituted by a skid beam. The respective track assembly further comprises a set of support wheels 23, 23a, at least one drive wheel 24, and an endless track 25. Said endless track 25 is arranged to run over said at least one drive wheel 24 and said set of support wheels 23, 23a.

Said set of support wheels 23, 23a and said at least one drive wheel 24 are arranged to be rotatably supported by said track support beam 22 in a suitable manner. Said set of support wheels 23, 23a are arranged in a pair configuration, i.e. the respective support wheels 23, 23a of each pair configuration are arranged on opposite sides of said track support beam 22. The support wheel 23a arranged at the very rear of the track support beam 22 also has a track tension wheel function and is constituted by a tension wheel 23a.

Said track assemblies 21 further also comprise an electrical drive arrangement (not shown) drivingly connected to said at least one drive wheel 24. In an alternative, the respective track assembly 21 comprises an electrical drive arrangement. In an alternative, said electrical drive arrangement is arranged in said track support beam 22 of said track assembly 21.

In more detail, said centre beam 32 is arranged for attachment to and suspension of said two opposite track assemblies 21, i.e. said track assembly pair 20, via a suspension device comprising a trailing arm configuration in the form of trailing arms 27 articulately connected in one end to the track support beam 22 and in the other end to the centre beam 32, and gas hydraulic cylinders 28 articulately connected in one end to the track support beam 22 and in the other end to the centre beam 32. The two track assemblies 21 of the track assembly pair 20 are arranged on opposite sides of the centre beam 32, such that the centre beam 32 is arranged in between said track assemblies 21 of the track assembly pair 20, and, such that the main extension direction of the centre beam 32 is substantially parallel to the main extension direction of the respective track assemblies 21 of the track assembly pair 20, as shown in FIG. 4. The same applies to the front vehicle unit 11 as well as to said further vehicle units 13, 14 shown in FIG. 1-3.

The front vehicle unit 11, the rear vehicle unit 12 and said further vehicle unit 13, 14 are, in a basic configuration in which the vehicle unit comprises a track assembly pair 20, a centre beam 30, 32, 132, 232 having a vertical steering link as well as a suspension configuration for suspension and resilient suspension of track assemblies 21, formed and sized substantially identical, thereby reducing the number of vehicle components and so reducing costs associated with construction, spare part stock and maintenance.

As shown in FIGS. 1-3, said further vehicle unit 13, 14 is configured for attachment to a further fixed load-carrying frame. Said further fixed load-carrying frame 140 is removably connectable to said fixed load-carrying frame 40 for connection to the rear vehicle unit 12, such that a train of vehicle units is formed connected to a load-carrying frame unit L comprising said fixed load-carrying frame 40 and further fixed load-carrying frame 140.

The load-carrying frame unit L refers herein to connected load-carrying frames comprising the load-carrying frame 40 connecting the front and rear vehicle units 11, 12 as well as one or more successive further load-carrying frames 13, 14 connected to each other.

Said load-carrying frame unit L is fixed in vertical link. Said load-carrying frame unit is also fixed in tipping link.

Hence, the connections between the load-carrying frame and subsequent further load-carrying frames are fixed in vertical link and tipping link.

Hence, the connection between said further load-carrying frame 13 and said load-carrying frame 14 as well as any connection between the further load-carrying frame 13 and the following further load-carrying frame 14 is fixed in vertical link, such that said first and further load-carrying frames are not allowed to pivot relative to each other about said vertical link.

Hence, the connection between said further load-carrying frame 13 and said load-carrying frame 14 as well as any connection between the further load-carrying frame 13 and the following further load-carrying frame 14 is fixed in tipping link, such that said first and further load-carrying frames are not allowed to pivot relative to each other about said tipping link.

Figure 5A:
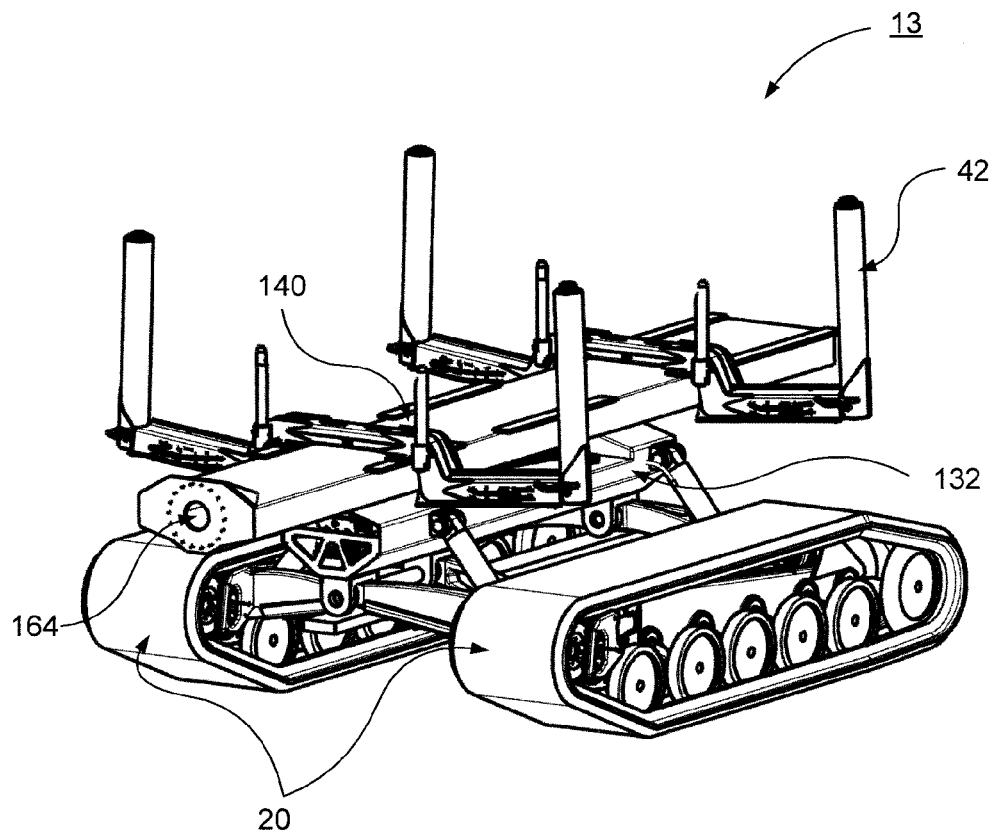
FIG. 5a schematically illustrates a perspective view of a vehicle unit of the vehicle of FIG. 1 comprising a further load-carrying frame for connection to the load-carrying frame connecting the front and rear vehicle units of the vehicle of FIG. 1.
Figure 5B:
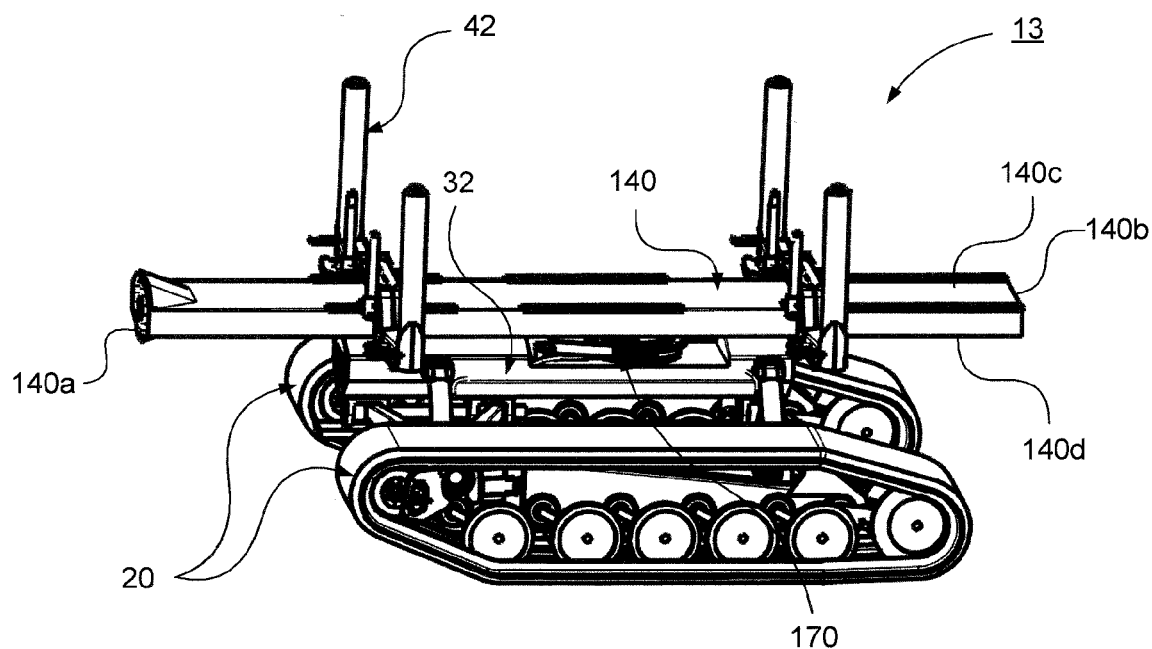

FIGS. 5a and 5b show a further vehicle unit 13 of the vehicle of FIG. 1 comprising a further load-carrying frame 140 for connection to the load-carrying frame 140 connecting front and rear vehicle units 11, 12 of the vehicle of FIG. 1.

Figure 6A:
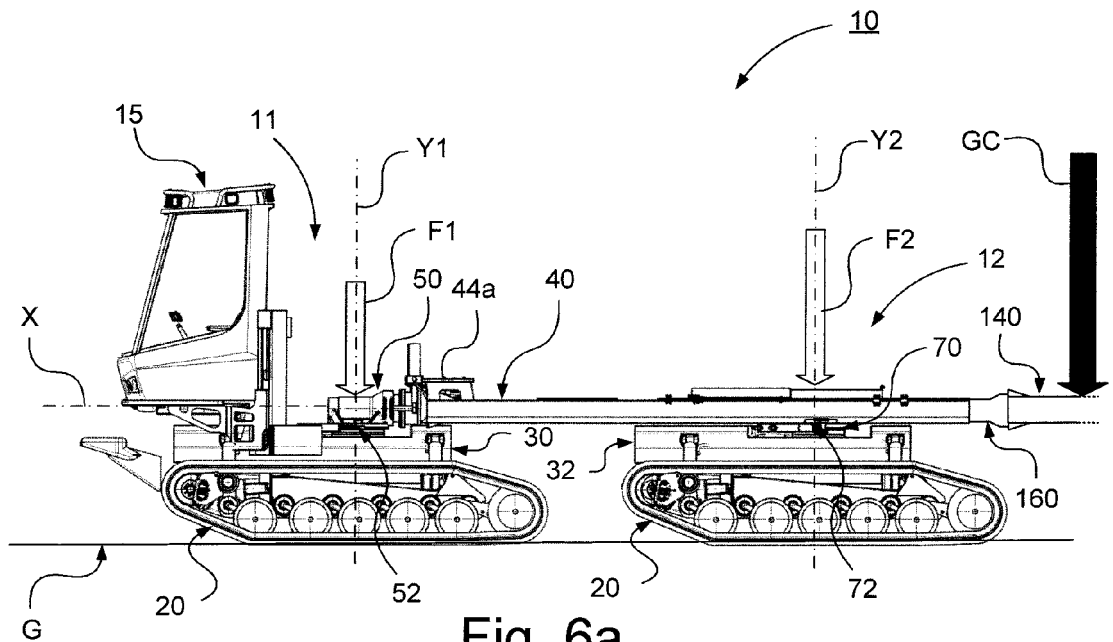
FIG. 6a schematically illustrates a side view of an articulated tracked vehicle comprising a load-carrying frame configured to receive, in a connecting way, a further load-carrying frame of a further vehicle unit in an embodiment of the present invention.
Figure 6B:
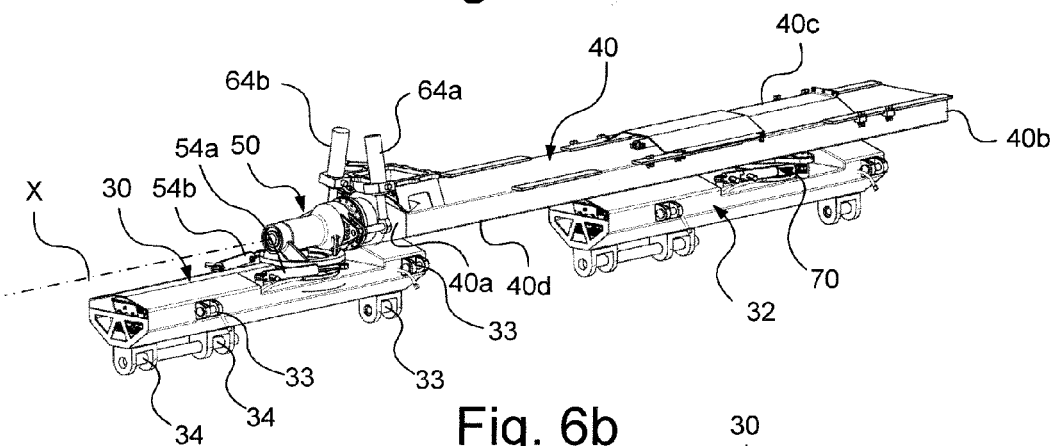
FIG. 6b schematically illustrates a perspective view of the load-carrying frame shown in FIG. 6a connected to underlying centre beams, in an embodiment of the present invention.
Figure 6C:
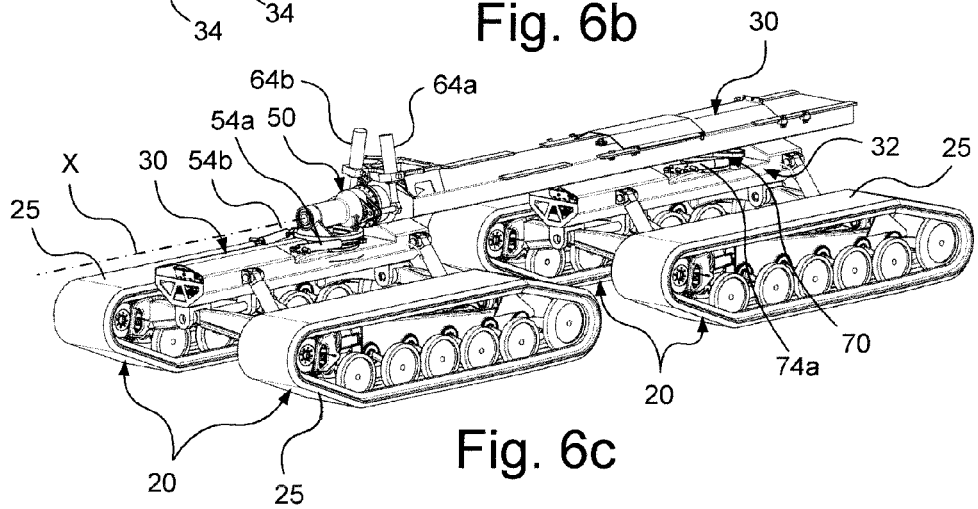
FIG. 6c schematically illustrates a perspective view of a vehicle having a front vehicle unit and a rear vehicle unit connected to the load-carrying frame shown in FIG. 6a, in an embodiment of the present invention.

FIG. 6a shows a side view of an articulated tracked vehicle comprising a load-carrying frame 40 configured to receive, in a connecting way, a further load-carrying frame 140 of a further vehicle unit, in an embodiment of the present invention. FIG. 6b shows a perspective view of the load-carrying frame 40 connected to the centre beams 30, 32 of the vehicle 10. FIG. 6c shows a perspective view of the load-carrying frame 40 connected to the centre beams 30, 32 connected to the track assembly pair 20 of the front and rear vehicle units 11, 12 of the vehicle 10.

The articulated tracked vehicle 10 comprises a front vertical steering link 52 arranged substantially centrally of the front vehicle unit 11. The front vertical steering link 52 is configured for pivotal attachment to a fixed load-carrying frame 40 connecting said front and rear vehicle units 11, 12. The front and rear vehicle units are pivotable relative to each other about the axis Y1 of the front vertical steering link 52.

The articulated tracked vehicle 10 comprises control means arranged to steer the front and rear vehicle units 11, 12 relative to each other about the front vertical steering link 52. The load-carrying frame 40 is pivotally attached to the front vertical steering link 52, such that said control means enables steering of the front and rear vehicle units relative to each other by steering the front vehicle unit 11 relative to the load-carrying frame 40 about the axis Y1 of said vertical steering link 52.

Said rear vehicle unit 12 comprises a rear vertical steering link 72 arranged substantially centrally of the rear vehicle unit 12 and configured for pivotal attachment to the load-carrying frame 40, such that the rear vehicle unit 12 is allowed to rotate relative to the load-carrying frame 40 about the axis Y2 of said rear vertical steering link 72.

Said control means is arranged to steer said front and rear vehicle units 11, 12 relative to each other about said rear vertical steering link 72 by steering the rear vehicle unit 11 relative to the load-carrying frame about the axis Y2 of said rear vertical steering link 52.

Said front vehicle unit comprises a rolling link 62, extending in the axial main extension direction of load-carrying frame 40, wherein the load-carrying frame 40 is configured for rotatable attachment to said rolling link 62, such that said front vehicle unit 11 is allowed to rotate relative to the load-carrying frame 40 about the axis X of said rolling link 62, such that said front and rear vehicle units 11, 12 are allowed to rotate relative to each other about said rolling link 62.

Said control means is arranged to steer the front and rear vehicle units relative to each other by steering the front vehicle unit 11 relative to the load-carrying frame about the axis X of said rolling link 62.

The load-carrying frame 40 is arranged to support the load of the vehicle 10.

Said load-carrying frame 40 is fixedly configured and comprises/is constituted by a fixed frame member. Said load-carrying frame 40 is arranged, such that the load is distributed over said front and rear vehicle units 11, 12 of the vehicle 10.

As shown in FIG. 6b, said load-carrying frame 40 has a front side 40a arranged to be facing forward in the longitudinal extension of the vehicle 10 when the longitudinal extensions of the front and rear vehicle units 11, 12 are substantially aligned. Said load-carrying frame 40 has a rear side 40b arranged to be facing backward in the longitudinal extension of the vehicle 10 when the longitudinal extensions of the front and rear vehicle units 11, 12 are substantially aligned. Said load-carrying frame 40 further has an upper side 40c on which the load is arranged to rest, and an underside 40d intended to be facing towards and be connected to the centre beam 30, 32 of the respective vehicle unit 11, 12.

Said load-carrying frame 40 is configured for said pivotal attachment to said front and rear vehicle units 11, 12 to enable pivoting of said front and rear vehicle units 11, 12 relative to each other.

The load-carrying frame 40 is configured to enable pivoting about said front vertical steering link 52. In more detail, the load-carrying frame 40 is configured for pivotal attachment about said front vertical steering link 52. Hereby, the front vehicle unit 11 and the load-carrying frame 40 are allowed to pivot relative to each other about the axis Y1 of said front vertical steering link 52. The axis Y1 of said front vertical steering link 52 runs substantially orthogonal to the axial main extension direction of the front vehicle unit 11, and orthogonal to the lateral direction of the front vehicle unit 11.

Said front vertical steering link 52 is arranged substantially centrally relative to the front vehicle unit 11. Hence, the axis Y1 of said front vertical steering link 52 is arranged to run substantially centrally relative to the front vehicle unit 11. The axis Y1 of said front vertical steering link 52 is arranged to run substantially centrally relative to the longitudinal and lateral directions of the front vehicle unit 11. Said front vertical steering link 52 is arranged substantially centrally between the respective track assemblies 21 of the track assembly pair 20 of the front vehicle unit 11. The axis Y1 of said front vertical steering link 52 is arranged to run substantially centrally between the respective track assemblies 21 of the track assembly pair 20 of the front vehicle unit 11. The axis Y1 of said front vertical steering link 52 is arranged to run substantially centrally relative to the longitudinal extension of the track assembly pair 20 of the front vehicle unit 11.

The load-carrying frame 40 is configured to enable pivoting about a rear vertical steering link 72. In more detail, the load-carrying frame 40 is configured for pivotal attachment about said rear vertical steering link 72. Hereby, the rear vehicle unit 12 and the load-carrying frame 40 are allowed to pivot relative to each other about an axis Y2 of said rear vertical steering link 72. The axis Y2 of said rear vertical steering link 72 runs substantially orthogonal to the axial main extension direction of the rear vehicle unit 12, and orthogonal to the lateral extension direction of the rear vehicle unit 12.

Said rear vertical steering link 72 is arranged substantially centrally relative to the rear vehicle unit 12. Hence, the axis Y2 of said rear vertical steering link 72 is arranged to run substantially centrally relative to the rear vehicle unit 12. The axis Y2 of said rear vertical steering link 72 is arranged to run substantially centrally relative to the longitudinal and lateral extensions of the rear vehicle unit 12. Said rear vertical steering link 72 is arranged substantially centrally between the respective track assemblies 21 of the track assembly pair 20 of the rear vehicle unit 12. The axis Y2 of said rear vertical steering link 52 is arranged to run substantially centrally between respective track assemblies 21 of the rear vehicle unit 12 of the track assembly pair 20. The axis Y2 of said rear vertical steering link 72 is arranged to run substantially centrally relative to the longitudinal extension of the track assembly pair 20 of the rear vehicle unit 12.

The load-carrying frame 40 is configured to enable rotation about a rolling link 62. In more detail, the load-carrying frame 40 is configured for rotatable attachment about said rolling link 62. Hereby, said front vehicle unit and said rear vehicle unit are allowed to rotate relative to each other about said rolling link 62. In this embodiment, the front vehicle unit 11 and the load-carrying frame 40 are allowed to rotate relative to each other about an axis of said rolling link 62. The axis X of said rolling link 62 runs in the axial main extension direction of the load-carrying frame 40.

In this embodiment, the axis X of said rolling link 62 is arranged to run such that it intersects the axis Y1 of the front vertical steering link 52. The axis X of said rolling link 62 is arranged to run substantially orthogonal to said front vertical steering link 52.

As seen in FIG. 5b, said further load-carrying frame 140 has a front side 140a arranged to be facing forward in the longitudinal extension of the vehicle 10 when the longitudinal extension of the front, rear and further vehicle units 11, 12, 13 are substantially aligned. Said further load-carrying frame 140 has a rear side 140b arranged to be facing forward in the longitudinal extension of the vehicle 10 when the longitudinal extension of the front, rear and further vehicle units 11, 12, 13 are substantially aligned. Said further load-carrying frame 140 further has an upper side 140c on which the load is arranged to rest and an underside 140d intended to be facing towards and be connected to further centre beam 132 of said further vehicle unit 13.

The further load-carrying frame 140 of said further vehicle unit 13 is configured in the front end 140a to be connected to a rear end of the load-carrying frame 40 and in the rear end 140b to a front end of a further load-carrying frame 240 of a further vehicle unit 14.

Hence, the further load-carrying frame 140 of the further vehicle unit 13 is in the front end 140a releasably connectable to a rear end of the load-carrying frame 40. Hence, the further load-carrying frame 140 of the further vehicle unit 13 is in the rear end 140b removably connectable to a front end of a further load-carrying frame 240 of a further vehicle unit 14.

The further load-carrying frame 140 of the further vehicle unit 13 is, in a basic position where the further load-carrying frame 140 runs in the longitudinal extension of the further vehicle unit 13 and hence is aligned with the centre beam 132 of the further vehicle unit 13, arranged to, by a front portion, protrude beyond the front end of the track assembly pair 20 and, by a rear portion, protrude beyond the rear end of the track assembly pair 20. This facilitates connection to the vehicle unit 12/further vehicle unit 14.

Said further load-carrying frame 140 has adjacent to the front end 140a an interface 164 for receiving a preceding load-carrying frame/further load-carrying frame of a preceding vehicle unit.

The further load-carrying frame 13 has adjacent to the rear end 140b an interface for receiving a succeeding further load-carrying frame of a succeeding vehicle unit.

Hence, respective further load-carrying frame has an interface in the front end for connection to a rear end of a preceding load-carrying frame of the preceding vehicle unit and an interface in the rear end for connection to a front end of a succeeding further load-carrying frame.

The further load-carrying frame 140 is configured to enable pivoting about a further vertical steering link 172. In more detail, the further load-carrying frame 140 is configured to pivot about said further vertical steering link 172. Hereby, the further vehicle unit 13 and the further load-carrying frame 140 are allowed to pivot relative to each other about an axis Y3 of said further vertical steering link 172. The axis Y3 of said further vertical steering link 172 runs substantially orthogonal to the axial main extension direction of the further vehicle unit 13 and orthogonal to the lateral extension direction of the further vehicle unit 13.

Said further vertical steering link 172 is arranged substantially centrally of the further vehicle unit 13. Hence, the axis Y3 of said further vertical steering link 172 is arranged to run substantially centrally of the further vehicle unit 13. The axis Y3 of said further vertical steering link 172 is arranged to run substantially centrally relative to the longitudinal and lateral extensions of the further vehicle unit 13. Said further vertical steering link 172 is arranged substantially centrally between respective track assemblies 21 of the track assembly pair 20 of the further vehicle unit 13. The axis Y3 of said rear vertical steering link 52 is arranged to run substantially centrally between respective track assemblies 21 of the track assembly pair 20 of the rear vehicle unit 12. The axis Y3 of said further vertical steering link 172 is arranged to run substantially centrally relative to the longitudinal extension of the track assembly pair 20 of the further vehicle unit 13.

Said control means is arranged to steer the further vehicle unit 13 about said further vertical steering link 172 relative to the further load-carrying frame 140 about the axis Y3 of said further vertical steering link 172.

The load-carrying frame 40 is configured for rotatable attachment to said further load-carrying frame 140 via a frame rolling link 162 to enable rotation of said load-carrying frame 40 and said further load-carrying frame 142 relative to each other about an axis X of said frame rolling link running in the axial main extension direction of the further load-carrying frame 140.

Said frame rolling link is arranged to run in the axial main extension direction of the frame unit L.

In this embodiment, the axis X of said frame rolling link 162 is arranged to run such that it intersects the axis Y3 of the further vertical steering link 172. The axis X of said frame rolling link 162 is arranged to run substantially orthogonal to said front vertical steering link 52. The axis X of the frame rolling link 162 is substantially aligned with the axis X of the rolling link and is therefore referred to with the same reference numeral.

Said control means is arranged to steer the further vehicle unit 13 relative to the rear vehicle unit 12 by steering the further vehicle unit 11 relative to the further load-carrying frame 140 about the axis X of said frame rolling link 162.

The same applies to the further vehicle unit 14 as to the further vehicle unit 13 as well as to any corresponding further vehicle units having such further load-carrying frame.

The fact that said front and rear vehicle units 11, 12 of the vehicle 10 thus are connected via said load-carrying frame 40 enables pivoting of said front and rear vehicle units 11, 12 relative to each other about the axis Y1, Y2 of the respective front and rear vertical steering links 52, 72, and also pivoting of said front and rear vehicle units 11, 12, relative to the load-carrying frame 40, and hence relative to the load-carrying frame unit L, about the axis Y1, Y2 of the respective front and rear vertical steering links 52, 72.

The fact that said front and rear vehicle units 11, 12 of the vehicle 10 thus are connected via said load-carrying frame 40 enables the front and rear vehicle units 11, 12 to roll relative to each other about said axis X of the rolling link 54.

In this embodiment, the attachment of the load-carrying frame 40 to the rear vehicle unit 12 is configured such that only pivoting of the load-carrying frame 40 relative to the rear vehicle unit 12 about said rear vertical steering link 72 is allowed.

The fact that said further vehicle unit 13 of the vehicle 10 thus is connected via said further load-carrying frame 140 enables pivoting of said further vehicle unit 13 relative to said further load-carrying frame 13 and hence relative to the load-carrying frame unit L as well as also the front and rear vehicle units 11, 12 about the axis Y3 of said further vertical steering link 172.

The fact that said rear vehicle unit 12 and the further vehicle unit 13 of the vehicle 10 thus are connected between the load-carrying frame 40 and the further load-carrying frame 140 via said frame rolling link 162 enables the further vehicle unit 13 to roll relative to the load-carrying frame 40 and hence relative to the rear vehicle unit 12 and the front vehicle unit 11 about said axis X of the frame rolling link 162. Hence, the front and rear vehicle units as well as the further vehicle unit are allowed to roll relative to each other about the axis of said frame rolling link.

The load-carrying frame 40 is configured for connection to a front steering device 50. Said front steering device 50 is configured for said pivotal/rotating attachment of the load-carrying frame 40 to said front vehicle unit 11. Said front steering device 50 comprises said front vertical steering link 52 and said rolling link 62.

Hence, said front steering device 50 is configured to enable pivoting/rotation of said front vehicle unit and said load-carrying frame 40 relative to each other about said front vertical steering link 52 and said rolling link 62.

The load-carrying frame 40 is configured for connection to a rear steering device 70. Said rear steering device 70 is configured for said pivotal attachment of the load-carrying frame 40 to said rear vehicle unit 12. Said rear steering device 70 comprises said rear vertical steering link 72.

Hence, said rear steering device 70 is configured to enable pivoting of said rear vehicle unit 12 and said load-carrying frame 40 relative to each other about said rear vertical steering link 72.

Thus, said front steering device 50 is arranged at the front vehicle unit 11, such that said front vertical steering link 52 is arranged substantially centrally of the front vehicle unit 11.

Thus, said rear steering device 70 is arranged at the rear vehicle unit 12, such that said rear vertical steering link 72 is arranged substantially centrally of the rear vehicle unit 12.

The further load-carrying frame 140 is configured for connection to a further steering device 150. Said further steering device 170 is configured for said pivotal attachment of the further load-carrying frame 140 to said further vehicle unit 13. Said further steering device 170 comprises said front further steering link 172.

Hence, said further steering device 170 is configured to enable pivoting of said further vehicle unit and said further load-carrying frame 140 relative to each other about said further vertical steering link 172. Said further steering device 170 substantially corresponds to said rear steering device 70.

Each further vehicle unit correspondingly has a steering device in accordance with the further steering device 170 such as of the further vehicle unit 13 to which the further load-carrying frame of the vehicle unit correspondingly is configured for pivotal connection.

The further load-carrying frame 140 is configured for connection to a roll steering device 160 adjacent to its front end. Said roll steering device 160 is configured for said rotatable attachment of the further load-carrying frame 140 to the rear end 40b of said load-carrying frame 40. Said roll steering device 160 comprises said frame rolling link 162.

The further load-carrying frame 140 is configured for connection to a roll steering device adjacent to its rear end. Said roll steering device is configured for rotatable attachment of the further load-carrying frame 140 to the front end of a further load-carrying frame 240.

During connection between the load-carrying frame 40 and the further load-carrying frame 140, as well as during connection between two further load-carrying frames 140, 240, said roll steering device may be integrally connected to the rear end area of the preceding load-carrying frame 40/the further load-carrying frame 140 for connection to the succeeding further load-carrying frame 140, 240, or integrally connected to the front end area of the succeeding further load-carrying frame 140, 240 for connection to the preceding load-carrying frame 40/the further load-carrying frame 140, or being connectable between the load-carrying frame 40/the further load-carrying frame 140 and the further load-carrying frame 240 via the connection interface of the load-carrying frame 40/the further load-carrying frame 140, 240.

The load-carrying frame 40 is arranged to rest on a central area of the front and rear vehicle units 11, 12, respectively, such that the weight of the load carried by the load-carrying frame 40 is carried centrally of the respective vehicle unit 11, 12. In more detail, the front and rear steering devices 50, 70 connecting said load-carrying frame 40 to said front and rear vehicle units 11, 12 are arranged centrally of the respective vehicle unit 11, 12, such that the weight of the load carried by the load-carrying frame 40 is carried centrally of the respective vehicle unit 11, 12.

The load-carrying frame 40 is arranged to rest on a central area between said track assemblies 21 of the track assembly pair 20 of the front and rear vehicle units 11, 12, such that the weight of the load carried by the load-carrying frame 40 is carried centrally of the respective track assembly pair 20, such that the ground pressure of the respective track assembly 21 is distributed optimally, i.e. is as low as possible. In more detail, the front and rear steering devices 50, 70 connecting said load-carrying frame 40 to said front and rear vehicle units 11, 12 are arranged centrally between said track assemblies 21 of the track assembly pair 20 of the respective vehicle unit 11, 12, such that the weight of the load carried by the load-carrying frame 40 is carried centrally of the respective track assembly pair 20.

Hence, the front and rear steering devices 50, 70 are arranged to support the load-carrying frame 40.

The respective further load-carrying frame 140, 240 is arranged to rest on a central area of said track assembly 21 of the track assembly pair 20 of the further vehicle unit 13, 14, such that the weight of the load carried by the further load-carrying frame 140, 240 is carried centrally of the respective track assembly pair 20, such that the ground pressure of the respective track assembly 21 is distributed optimally, i.e. is as low as possible. In more detail, the further steering device of the respective further vehicle unit 13, 14 is arranged centrally between said track assembly 21 of the track assembly pair 20 of the respective vehicle unit 13, 14, such that the weight of the load carried by the further load-carrying frame 140, 240 is carried centrally of the respective track assembly pair 20.

Hence, the further steering device of the respective further vehicle 13, 14 is arranged to support the further load-carrying frame 140, 240.

The vehicle 10 is configured with front and rear centre beams 30, 32 for the front and rear vehicle units 11, 12 as well as a further centre beam 132, 232 for the respective further vehicle unit 13, 14 connecting the track assemblies 21 of the track assembly pair of the respective vehicle unit 11, 12, 13, 14.

The front steering device 50 is journaled to said front centre beam 30 of the front vehicle unit 11 about said front vertical steering link 52. The front steering device 50 is journaled to said front centre beam 30 of the front vehicle unit 11, such that the weight of the load carried by the load-carrying frame 40 is carried by the front centre beam 30 via the front steering device 50.

The rear steering device 70 is journaled to said rear centre beam 32 of the rear vehicle unit 12 about said rear vertical steering link 72. The rear steering device 70 is journaled to said rear centre beam 32 of the rear vehicle unit 12, such that the weight of the load carried by the load-carrying frame 40 is carried by the rear centre beam 32 via the rear steering device 70.

The front steering device 50 is journaled to said load-carrying frame 40 about said rolling link 62.

The further steering device 170 is journaled to said further centre beam 132 of the further vehicle unit 13 about said further vertical steering link 172. The further steering device 170 is journaled to said further centre beam 132 of the further vehicle unit 13, such that the weight of the load carried by the further load-carrying frame 140 is carried by the further central beam 132 via the further steering device 170.

The load-carrying frame 40 and the further load-carrying frame 140 are journaled to by means of said roll steering device 160 about said frame rolling link 162.

Referring to FIGS. 3 and 6a, the distribution of the load of the vehicle 10 is illustrated. The load is configured to be distributed over substantially the whole longitudinal extension of the load-carrying frame unit L, which for the vehicle 10 illustrated in FIG. 3, comprising three vehicle units, a front, a rear and a further vehicle unit 11, 12, 13, means distribution over the longitudinal extensions of the load-carrying frame 40 and the further load-carrying frame 140.

The load may be constituted by any suitable load, advantageously load constituted by longer goods/members. In an alternative, the load is constituted by timber. When the load is distributed over substantially the whole longitudinal extension of the load-carrying frame unit L, the centre of gravity GC of the load will end up centrally over the load-carrying frame unit L as illustrated by the filled arrow GC. This results in that the forces F1, F2; F3 generated by the load thus distributed over the load-carrying frame unit L act on the respective vehicle unit 11, 12, 13, as illustrated by the non-filled arrows F1, F2, F3.

Hence, the forces F1, F2 and F3, respectively, generated by the load, will act centrally on the respective vehicle unit 11, 12, 13. Thereby, the pressure from the track assemblies 21 towards the ground G, i.e. the ground pressure, will be evenly distributed over the contact surface between the ground G and the endless tracks 25. This gives rise to a low ground pressure which is advantageous since ground damages hereby are efficiently minimized.

The force F1 acting on the front vehicle unit 11 is arranged to act on the front steering device 50, connected to the load-carrying frame 40, substantially in the direction of the axis Y1 of the front vertical steering link 52 of the front steering device 50.

The force acting on the rear vehicle unit 12 is arranged to act on the rear steering device 70, connected to the load-carrying frame 40, substantially in the direction of the axis Y2 of the rear vertical steering link 72 of the rear steering device 70.

The force acting on the further vehicle unit 13 is arranged to act on the further steering device 170, connected to the further load-carrying frame 140, substantially in the direction of the axis Y3 of the further vertical steering link 172 of the further steering device 170.

Said load-carrying frame 40 of the vehicle 10 is arranged to support the vehicle structure, in this alternative in the form of U-beam configuration, loading gate and crane. Said crane is arranged to be attached to a crane attachment 44a of the load-carrying frame 40.

A power supply 5, such as a combustion engine illustrated in FIG. 2, is arranged to be supported centrally of the front vehicle unit 11. In more detail, the power supply 5 is arranged to be supported by the front steering device 50 connected to the load-carrying frame 40. This provides for improved weight distribution of the front vehicle unit 11.

Thus, by distributing the load evenly over the vehicle 10, the track assemblies 21 of the track assembly pair 20 of the front of the vehicle unit 11, the track assemblies 21 of the track assembly pair 20 of the rear vehicle unit 12 and the track assemblies 21 of the track assembly pair 20 of the further vehicle unit 13 of the tracked vehicle 10 are loaded to the same extent, which results in that the track assemblies 21 for the front vehicle unit, the rear vehicle unit, and the further vehicle unit 13 may be sized equally. This results in that track assemblies of the same kind can be used for the front and rear vehicle units 11, 12 and the further vehicle unit 13/further vehicle units and so vehicle units 11, 12, 13 of the same kind comprising centre beams 30, 32, 132 of the same kind and suspension configuration of the same kind for suspension and resilient suspension of the track assemblies, thus reducing number of vehicle components and hence reducing the cost of construction, spare part stock and maintenance.

Figure 7A:
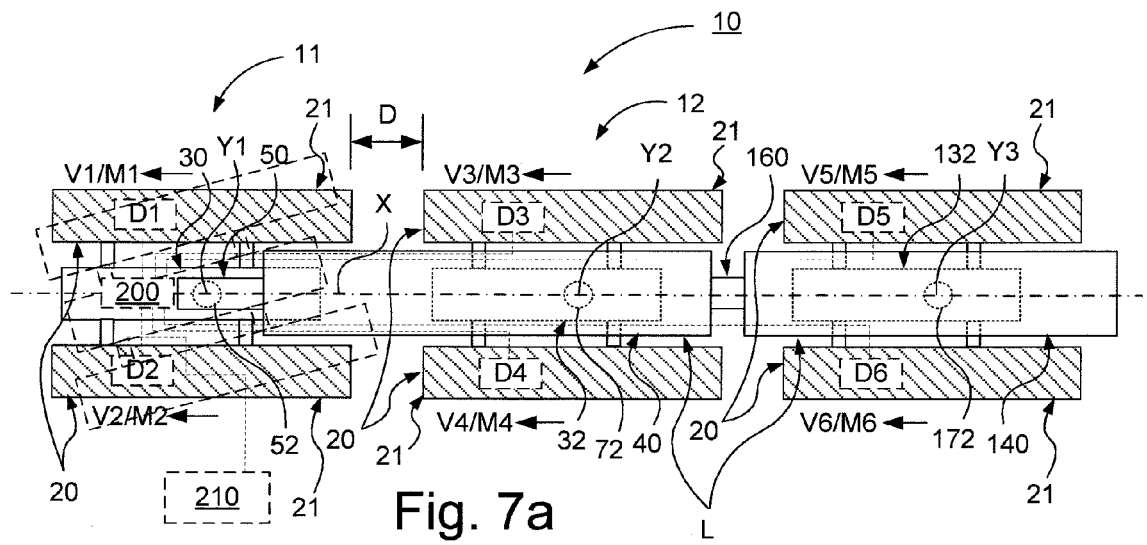
FIG. 7a schematically illustrates a top view of a vehicle having a front vehicle unit and a rear vehicle unit connected to a load-carrying frame and a further vehicle unit connected to the rear vehicle unit having a further load-carrying frame according to the present invention, where the vehicle is in a basic position where the longitudinal extension of the front, rear and further vehicle units are aligned.

Said front, rear and further vehicle units 11, 12, 13 are in a basic position arranged relative to each other, such that the longitudinal extension of the front vehicle unit 11 is substantially aligned with the longitudinal extension of the rear vehicle unit 12 and the longitudinal extension of the further vehicle unit 13. Said front, rear and further vehicle units 11, 12, 13 are in said basic position arranged relative to each other, such that the track assemblies 21 of the track assembly pair 20 of the front vehicle unit 11 are substantially aligned with the track assemblies 21 of the track assembly pair of the rear vehicle unit 12 and the track assemblies 21 of track assembly pair of the further vehicle unit 13. Said front, rear and further vehicle units 11, 12, 13 are in said basic position arranged relative to each other, such that the longitudinal extension of the centre beam of the front vehicle unit 11 is substantially aligned with the longitudinal extension of the centre beam of the rear vehicle unit 12 and the longitudinal extension of the centre beam of the further vehicle unit 13. Said front, rear and further vehicle units 11, 12, 13 are in said basic position arranged relative to each other, such that the longitudinal extension of the load-carrying frame unit L is aligned with the longitudinal extensions of the front, rear and further vehicle units 11, 12 13. FIG. 7a illustrates the basic configuration of the vehicle 10.

In said basic position of the vehicle 10, the load-carrying frame 40 is arranged to run over a rear section of the front vehicle unit 11 and run substantially over the rear vehicle unit 12, such that the weight of load carried by the load-carrying frame 40 is carried centrally of the respective track assembly pair 20.

In said basic position of the vehicle 10, the load-carrying frame 40 is configured to protrude over the front vehicle unit 11, such that said front steering device 50 rests on the front centre beam 30.

In said basic position of the vehicle 10, the load-carrying frame 40 is configured to protrude over the rear centre beam 32 of said rear vehicle unit 12, such that said rear steering device 70 rests on the rear centre beam 32.

In said basic position of the vehicle 10, the further load-carrying frame 140 is configured to protrude over the further centre beam 132 of said further vehicle unit 13, such that said further steering device 170 rests on the further centre beam 132.

Said front steering device 50 comprises front steering members in the form of steering cylinders 54a, 54b for steering the front vehicle unit 11 and the load-carrying frame 40 relative to each other. In more detail, the front steering device 50 comprises a first and a second front steering cylinder 54a, 54b arranged to pivot said front vehicle unit 11 and said load-carrying frame 40 relative to each other about said front vertical steering link 52. Said first and second steering cylinders 54a, 54b are arranged on opposite sides of the axis Y1 of said front vertical steering link 52. Said first and second front steering cylinders 54a, 54b are in one of its end pivotally attached to the front centre beam 30 and in its other end pivotally attached to the front vertical steering link 52 of the front steering device 50.

Said first and second front steering cylinders 54a, 54b, respectively, comprises a cylinder as well as a piston provided with a piston rod. Said cylinder of the first and second front steering cylinders 54a, 54b is pivotally attached to the front centre beam 30 and said piston rod is pivotally attached to the front vertical steering link 52 of the front steering device 50. In this alternative, said first and second front steering cylinders 54a, 54b are hydraulic steering cylinders.

Said front steering device 50 comprises roll steering members in the form of roll steering cylinders 64a, 64b for steering the front vehicle unit 11 and the load-carrying frame 40 relative to each other. In more detail, the front steering device 50 comprises a first and a second front roll steering cylinder 64a, 64b arranged to rotate said vehicle unit 11 and said load-carrying frame 40 relative to each other about said rolling link 62. Said first and second front roll steering cylinders 64a, 64b are arranged on opposite sides of the axis X of said rolling link 62. Said first and second front roll steering cylinders 64a, 64b are in one end rotatably attached to the load-carrying frame 40 and in its other end rotatably attached to the rolling link 62 of the front steering device 50.

In an alternative, said roll steering cylinders 64a, 64b are provided with functionality for stabilizing the vehicle units 11, 12 relative to each other, and functionality for enhanced comfort. In an alternative, said roll steering cylinders 64a, 64b are provided with a locking functionality for stabilizing the front vehicle unit 11 in relation to the rear vehicle unit 12 and the load-carrying frame 40. In an alternative, said roll steering cylinders 64a, 64b are provided with damping functionality for enhancing the vehicle comfort. In an alternative, said roll steering cylinders 64a, 64b are provided with angle adjustment functionality for adjusting the angle so as to e.g. level the load-carrying frame 40.

Said first and second roll steering cylinders 64a, 64b, respectively, comprises a cylinder as well as a piston provided with a piston rod. Said cylinder of the first and second roll steering cylinder is rotatably attached to the load-carrying frame 40 and said piston rod is rotatably attached to the rolling link 62 of the front steering device 50. In this alternative, said first and second roll steering cylinders 64a, 64b are hydraulic steering cylinders.

Said rear steering device 70 comprises rear steering members in the form of steering cylinders 54a, 54b for steering the rear vehicle unit 12 and the load-carrying frame 40 relative to each other. In more detail, the rear steering device 70 comprises a first and a second rear steering cylinder 74a, 74b arranged to rotate said rear vehicle unit 12 and said load-carrying frame 40 relative to each other about said rear vertical steering link 72. Said first and second steering cylinders 54a, 54b are arranged on opposite sides of the axis Y2 of said rear vertical steering link 72. Said first and second rear steering cylinders 74a, 74b are in one of its end pivotally attached to the centre beam and in its other end pivotally attached to the rear vertical steering link 72 of the rear steering device 70.

Said first and second rear steering cylinders 74a, 74b, respectively, comprises a cylinder as well as a piston provided with a piston rod. Said cylinder of the first and second rear steering cylinders 74a, 74b is pivotally attached to the centre beam 30 and said piston rod is pivotally attached to the rear vertical steering link 72 of the rear steering device 70. In this alternative, said first and second rear steering cylinders 74a, 74b are hydraulic steering cylinders.

According to the embodiment described above, the front steering device 50 comprises first and second steering members in the form of first and second steering cylinders 54a, 54b, and first and second roll steering members in the form of roll steering cylinders 64a, 64b, and the rear steering device 70 first and second steering members in the form of first and second steering cylinders 74a, 74b, where said steering cylinders 54a, 54b, 74a, 74b and said roll steering cylinders 64a, 64b are constituted by hydraulic steering cylinders/roll steering cylinders having cylinder and piston rod.

In an alternative, respective further steering device, such as the further steering device 170 of the further vehicle unit 13, comprises steering members in the form of first and second steering cylinders in accordance with the first and second rear steering cylinders 74a, 74b described above.

In an alternative, respective further roll steering device, such as the roll steering device 160 connecting the load-carrying frame 40 and the further load-carrying frame 140, comprises roll steering members in the form of a first and a second roll steering cylinder in accordance with the first and the second roll steering cylinders 64a, 64b described above.

Any suitable steering members/roll steering members could alternatively be used. In an embodiment, the steering members and/or the roll steering members of said front steering device 50 and/or the steering members of said rear steering device 70 are constituted by steering rack members. In an embodiment, the steering members and/or the roll steering members of said front steering device 50 and/or the steering members of said rear steering device 70 are constituted by a linear motor, which, in an alternative, is constructed with a ball screw and a ball nut arranged to run along the ball screw, wherein the nut is arranged to be moved by rotating the ball screw by means of an electric motor.

In an alternative, instead of said front steering members being constituted by first and second steering cylinders, said front steering members could be constituted by a single steering cylinder for steering the front vehicle unit relative to the load-carrying frame about the axis of the front vertical steering link.

In an alternative, instead of said rear steering members being constituted by first and second steering cylinders, said rear steering members could be constituted by a single steering cylinder for steering the rear vehicle unit relative to the load-carrying frame about the axis of the rear vertical steering link.

In an alternative, instead of said roll steering members being constituted by first and second roll steering cylinders, said roll steering members could be constituted by a single roll steering cylinder for steering the front vehicle unit relative to the load-carrying frame about the axis of the rolling link.

Referring to FIG. 7a-d, a top view of the vehicle units 11, 12, 13 of the vehicle 10 is shown.

FIG. 7a shows the vehicle 10 in said basic position with the vehicle units 11, 12, 13 aligned with each other and the load-carrying frame unit L. FIG. 7a also shows the front vehicle unit 11, dashed and pivoted in a steering angle relative to the rear vehicle unit 12, the further vehicle unit 13 and the load-carrying frame unit L.

Figure 7B:
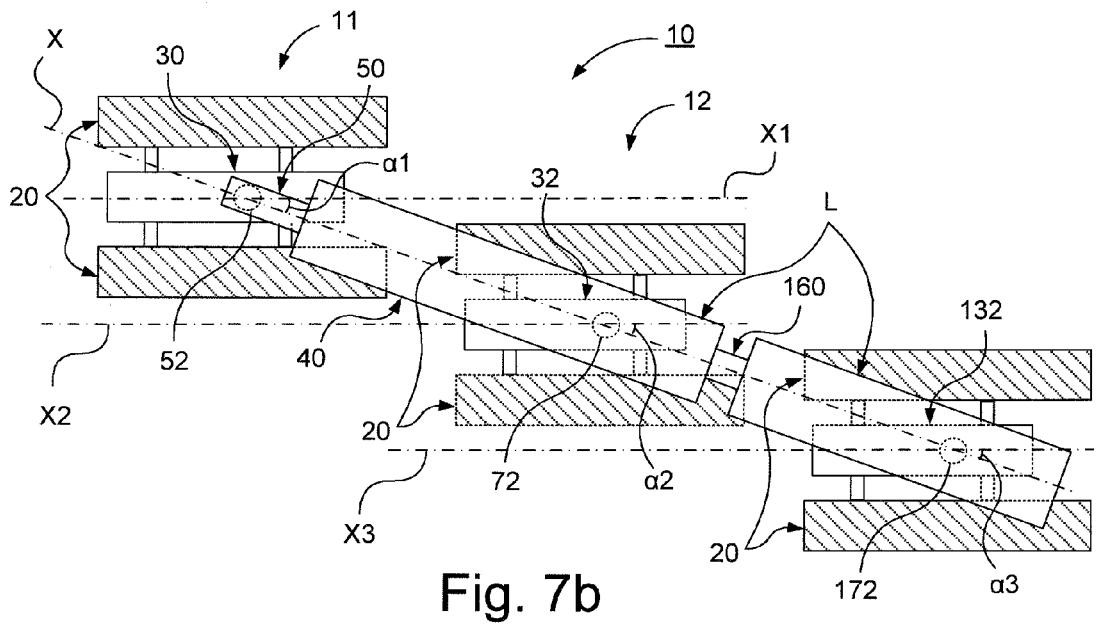
FIG. 7b schematically illustrates a top view of the vehicle of FIG. 7a during crab steering, in an embodiment of the present invention.

FIG. 7b shows the vehicle 10 during so-called crab steering, i.e. when the front, rear and further vehicle units 11, 12, 13 are parallel to each other in their longitudinal extensions and where the load-carrying frame unit L is pivoted relative to said front, rear and further vehicle units 11, 12, 13 about the respective front, rear and further vertical steering link 52, 72, 172. This results in that the front, rear and further vehicle units 11, 12, 13 are parallelly displaced relative to each other, such that the load-carrying frame unit L forms a first angle $\alpha 1$ relative to the longitudinal extension X1 of the front vehicle unit 11, and, such that the load-carrying frame unit L forms a second angle $\alpha 2$ relative to the longitudinal extension of the rear vehicle unit 12 and, such that the load-carrying frame unit L forms a third angle $\alpha 3$ relative to the longitudinal extension of the further vehicle unit 13, where said first, second and third angles are substantially the same.

In an embodiment, said crab steering is accomplished in that said first and second front steering cylinders 54a, 54b of the front steering device 50, said first and second rear steering cylinders 74a, 74b of the rear steering device 70 and said first and second rear steering cylinders of the further steering device 70, control the pivoting about respective axis Y1, Y2, Y3 of the respective front, rear and further vertical steering link 52, 72, 172 so as to form said first, second and third angles $\alpha 1$, $\alpha 2$, $\alpha 3$. In an alternative, the steering cylinders of respective steering devices 50, 70, 170 are arranged to be locked in this mode to maintain the positions of the vehicle units 11, 12, 13 and the load-carrying frame unit L relative to each other during operation of the vehicle 10 during said crab steering.

By such crab steering the impact on the ground is reduced since the endless tracks 25 of the respective front, rear and further vehicle units 11, 12, 13 are allowed to pass different areas of the ground G. Furthermore, the lateral stability of the vehicle 10 is improved by said crab steering.

Thus, by pivoting the vehicle units 11, 12, 13 relative to the load-carrying frame 40 about a front, a rear and a further vertical steering link 52, 72, 172 instead of, as in conventional articulated vehicles, pivoting the vehicle units about a vertical steering link arranged in between the vehicle units, the manoeuvrability of the vehicle 10 is improved, since a larger steering angle can be obtained. Furthermore, the lateral stability of the vehicle 10 is improved by means of said steering manoeuvre as compared to steering in accordance with the above-mentioned conventional articulated vehicle.

The articulated vehicle 10 comprises an electrical drive arrangement for driving said track assembly pair 20. The electrical drive arrangement comprises a drive unit D1, D2, D3, D4, D5, D6 arranged at the respective track assembly 21 of the respective track assembly pair 20. The respective drive unit is arranged to drive the drive wheel of the respective track assembly 20 for said driving of the articulated vehicle 10. In an alternative, the respective drive unit is integrated into a respective track assembly 21 for said driving. In an alternative, the respective drive unit comprises an electric motor as well as a transmission configuration connected to the electric motor and configured to transfer power to the drive wheel of the respective track assembly 20 for driving the track assembly. In an alternative, the respective electric motor is arranged, such that the axis of the electrical motor runs in the main extension direction of the track assembly and, hence, in the main extension direction of the respective vehicle unit. In an alternative, the respective drive unit is integrated into the track support beam of the track assembly.

Said electrical drive arrangement comprises a first drive unit D1 arranged at the right track assembly 21 of the track assembly pair 20 of the front vehicle unit 11. Said electrical drive arrangement comprises a second drive unit D2 arranged at the left track assembly 21 of the track assembly pair 20 of the front vehicle unit 11.

Said electrical drive arrangement comprises a third drive unit D3 arranged at the right track assembly 21 of the track assembly pair 20 of the rear vehicle unit 12. Said electrical drive arrangement comprises a fourth drive unit D4 arranged at the left track assembly 21 of the track assembly pair 20 of the rear vehicle unit 12.

Said electrical drive arrangement comprises a fifth drive unit D5 arranged at the right track assembly 21 of the track assembly pair 20 of the further vehicle unit 13. Said electrical drive arrangement comprises a sixth drive unit D6 arranged at the left track assembly 21 of the track assembly pair 20 of the further vehicle unit 13.

The first drive unit D1 is configured to drive the right track assembly 21 of the front vehicle unit 11 with a speed V1 and a torque M1.

The second drive unit D2 is configured to drive the left track assembly 21 of the front vehicle unit 11 with a speed V2 and a torque M2.

The third drive unit D3 is configured to drive the right track assembly 21 of the rear vehicle unit 12 with a speed V3 and a torque M3.

The fourth drive unit D4 is configured to drive the left track assembly 21 of the rear vehicle unit 12 with a speed V4 and a torque M4.

The fifth drive unit D5 is configured to drive the left track assembly 21 of the further vehicle unit 13 with a speed V5 and a torque M5.

The sixth drive unit D6 is configured to drive the left track assembly 21 of the further vehicle unit 13 with a speed V6 and a torque M6.

Hence, the respective track assemblies 21 of the front vehicle unit, the rear vehicle unit and the further vehicle unit are configured, such that they can be individually driven. The respective track assemblies 21 of the front vehicle unit, the rear vehicle unit and the further vehicle unit are configured, such that they can be individually controlled.

Hereby, in an embodiment, said control means is arranged to individually control the driving of the respective track assembly 21 of said front, rear and further track assembly pairs 20 to achieve pivoting of said front, rear and further vehicle units 11, 12, 13 relative to each other.

Said control means is arranged to individually control the driving of the respective track assembly of said front, rear and further track assembly pairs based on torque and/or speed control. Said control means is arranged to individually control the driving of the respective track assembly of said front and rear track assembly pairs by controlling the torque and/or speed of the respective drive unit D1, D2, D3, D4, D5, D6.

Said control means comprises a control unit 200 for said controlling of the driving of the respective track assembly 21. Said control unit 200 is signal-connected to the respective drive unit D1, D2, D3, D4, D5, D6 via links for controlling the torque and/or speed of the respective drive unit for said individual controlling of the track assemblies for steering the articulated vehicle 10, by thus steering the front vehicle unit 11 relative to the load-carrying frame 40, the rear vehicle unit 12 and the further vehicle unit 13 about said front, rear and further vertical steering links 52, 72, 172.

Said control unit 200 is also signal-connected to said front steering link 52, said rear steering link 72 and said further steering link 172. Said control unit 200 is signal-connected to front steering cylinders (not shown here) connected to the front steering link 52 and to rear steering cylinders (not shown here) connected to the rear steering link 72 and to steering cylinders (not shown here) connected to the further steering link 172.

In an alternative, said control means comprises actuating means 210 for controlling vehicle units by means of steering cylinders and/or by track assemblies. Said actuating means is signal-connected to the electronic control unit 200. Said actuating means can be used by the vehicle operator for controlling during operation of the vehicle. In an alternative, said actuating means comprises a joystick or equivalent for said controlling. The joystick may be operated by the vehicle operator. Said actuating means 210 may comprise actuator(s) for controlling the vehicle via a vehicle cab, remotely, as a slave to another vehicle unit, alternatively autonomously. The track assemblies would have the possibility to be controlled via a driving cab, remotely, as a slave to another vehicle, alternatively autonomously.

In an alternative, said control means comprises a synchronization function. In an alternative, said synchronization function is comprised in the synchronization means of the electronic control unit 200.

In an alternative, the synchronization function is activatable by said actuating means.

The synchronization function comprises synchronization of vehicle units to facilitate operation of the vehicle. The synchronization function comprises synchronization of vehicle units, such that at least the rear vehicle unit and the respective connected further vehicle unit have substantially the same longitudinal extension directions. The synchronization function comprises synchronization of vehicle units, such that at least the rear vehicle unit and the respective connected further vehicle unit have substantially the same pivoting angles relative to its respective steering link.

Figure 8A:
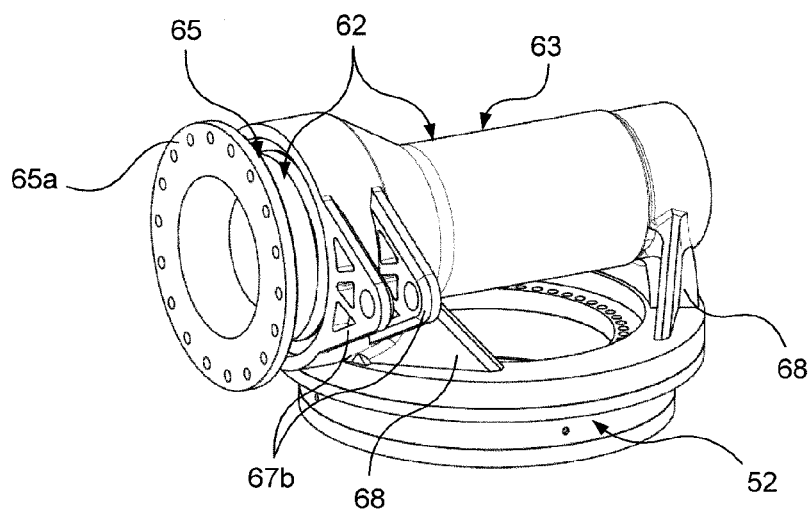
FIG. 8a schematically illustrates a perspective view of a part of a steering device for the front vehicle unit arranged to be connected to and interact with the load-carrying frame of the present invention.
Figure 8B:
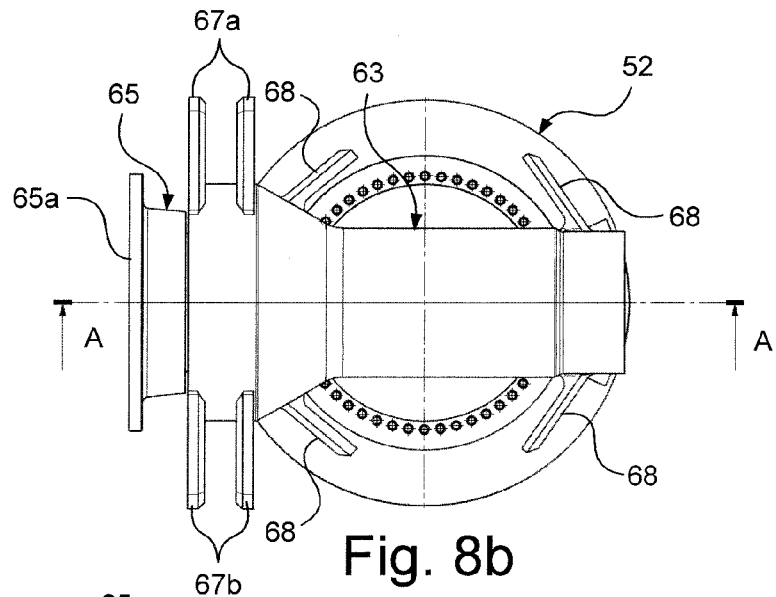
Figure 8C:
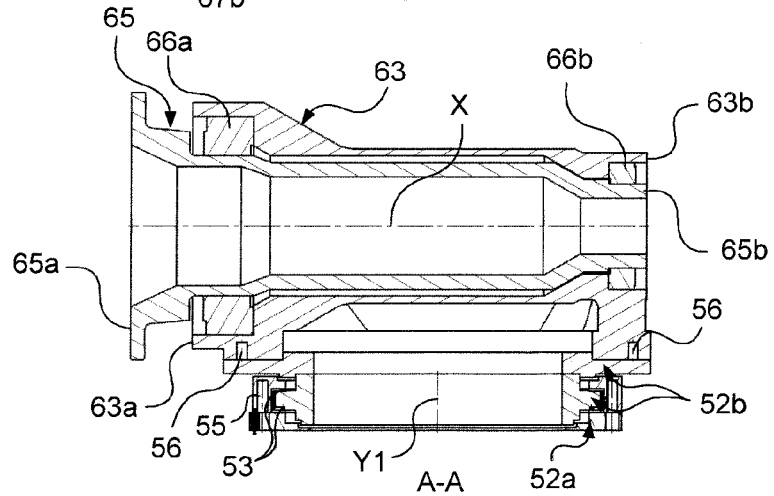
FIG. 8c schematically illustrates a cross section of the steering device shown in FIG. 8b.

FIG. 8a-c schematically illustrate various views of a part of the front steering device 50 for the front vehicle unit 11 arranged to be connected to and interact with the load-carrying frame 40, according to the present invention.

The front steering device 50 is journaled to said front centre beam 30. The front steering device 50 is pivotally journaled at said front centre beam 30. The front steering device 50 is journaled to said load-carrying frame 40. The front steering device 50 is pivotally journaled at said load-carrying frame 40.

The front steering device 50 comprises a front steering bearing configuration 52 for pivoting the front vehicle unit 11 relative to the load-carrying frame 40 about said axis Y1 running substantially orthogonal to the longitudinal and lateral extensions of the front vehicle unit 11. The front steering bearing configuration 52 comprises said front vertical steering link 52.

Said front steering bearing configuration 52 is annularly configured. Said front steering bearing configuration 52 comprises an outer bearing ring 52a arranged to be attached to said front centre beam 30. In this embodiment, said outer bearing ring 52a is arranged to be attached to the upper side of said front centre beam 30. In this embodiment, said outer bearing ring 52a is arranged to be attached to said front centre beam 30, such that its centre axis Y1 is oriented substantially centrally relative to the longitudinal extension of the track assembly pair 20 of the front vehicle unit 11. Said outer bearing ring 52a is arranged to be attached to said front centre beam 30 by means of fastening members 55, where said fastening members, in an alternative, are constituted by screw connection(s) and/or rivet connection(s) and/or bolt connection(s).

Said front steering bearing configuration 52 comprises an inner bearing ring 52b arranged inside said outer bearing ring 52a. Said inner bearing ring 52b is pivotally arranged relative to said outer bearing ring 52a via a sealing-provided bearing 53 for said pivotal bearing. Hence, said inner bearing ring 52b is pivotally arranged relative to said front centre beam 30 about an axis Y1 that is orthogonal to the longitudinal and lateral extensions of the front centre beam 30. Said inner bearing ring 52b is pivotally arranged about a vertical axis Y1.

Said front steering device 50 comprises a roll bearing configuration 62 for rotation of the front vehicle unit 11 relative to the load-carrying frame 40 about an axis running substantially in the longitudinal extension of the load-carrying frame 40. The roll bearing configuration 62 comprises said rolling link 62.

Said roll bearing configuration 62 is fixedly connected to said steering bearing configuration 52, such that force acting on the roll bearing configuration 62 is transferred to and absorbed by the steering bearing configuration 52. Said roll bearing configuration 62 is arranged to be supported by said steering bearing configuration 52.

Said roll bearing configuration 62 is cylindrically configured. Said roll bearing configuration 62 is arranged to be attached to said load-carrying frame 40 as well as to said steering bearing configuration 52. Said roll bearing configuration 62 comprises a bearing housing 63. Said bearing housing 63 is arranged to be attached to said inner bearing ring 52b by means of fastening members 56, where said fastening members, in an alternative, are constituted by screw connection(s) and/or rivet connection(s) and/or bolt connection(s).

Said bearing housing 63 is arranged on top of said steering bearing configuration 52. Said bearing housing 63 comprises a cylindrical body arranged to run across said steering bearing configuration. Said bearing housing 63 is arranged on said steering bearing configuration 52, such that the centre axis X of the cylindrical body of the bearing housing 63 crosses the centre axis Y1 of the steering bearing configuration 52.

Said bearing housing 63 comprises support portions 68 arranged to supportively support and connect the cylindrical body of the bearing housing 63 to said inner bearing ring 52b.

The bearing housing 63 of the roll bearing configuration 62 is attached to said inner bearing ring 52b of the front steering bearing configuration 52. Hence, the bearing housing 63 is fixedly connected to the inner bearing ring 52b.

Said roll bearing configuration 62 further comprises an inner roll bearing cylinder 65 arranged inside the cylindrical body of the bearing housing 63. Said roll bearing cylinder 65 is concentrically arranged relative to said cylindrical body of the bearing housing 63. Said roll bearing cylinder 65 is rotatably arranged relative to the cylindrical body of said bearing housing 63. Said inner roll bearing cylinder 65 is rotatably arranged relative to the cylindrical body of said bearing housing 63. Hence, said inner roll bearing cylinder 65 is rotatably arranged relative to said front centre beam 30 about an axis X arranged to run in the main longitudinal extension of the load-carrying frame 40.

Said cylindrical body of the bearing housing 63 has a first end 63a intended to be facing towards the load-carrying frame 40, as well as an opposite second end 63b. Said first end 63a has a larger diameter than the opposite second end 63b.

Said inner roll bearing cylinder 65 has a first end 65a intended to be facing towards the load-carrying frame 40, as well as an opposite second end 65b. Said first end 65a has a larger diameter than the opposite second end 65b. Said first end 65a of the inner roll bearing cylinder 65 is arranged to protrude from the cylindrical body of the bearing housing 63. Said first end 65a of said roll bearing cylinder 65 is configured to be attached to the end 40a of the load-carrying frame 40 facing towards the front steering device 50. In this alternative, the first end 65a of the roll bearing cylinder comprises attachment points for bolt connections or similar.

Said inner roll bearing cylinder 65 is rotatably journaled relative to the cylindrical body of the bearing housing 63 via a first bearing 66a arranged at the first end 63a of the cylindrical body of the bearing housing 63, and a second bearing 66b arranged at the second end of the cylindrical body of the bearing housing 63.

Said inner roll bearing cylinder 65 is arranged to be attached to the load-carrying frame 40. Said inner roll bearing cylinder 65 is arranged to be attached to the end area of the load-carrying frame 40 facing towards the front steering device 50 of the front vehicle unit 11. Said inner roll bearing cylinder is arranged to be attached to said load-carrying frame 40 by means of fastening members, where said fastening members, in an alternative, are constituted by screw connection(s) and/or rivet connection(s) and/or bolt connection(s).

The roll bearing configuration further comprises first and second attachment members 67a, 67b, arranged at the bearing housing 63 on the respective sides of the bearing housing 63, for pivotal attachment of the above mentioned first and second roll steering cylinders 64a, 64b.

The front steering bearing configuration 52 comprises first and second attachment members, not shown in FIG. 7a-c, arranged on respective sides of outer bearing ring 52a, for pivotal attachment of the above mentioned first and second front steering cylinders 54a, 54b.

Said front centre beam 30 is configured to receive said front steering device 50. Said front centre beam 30 is configured to receive said front steering bearing configuration 52 of the front steering device 50.

FIG. 8a-c schematically illustrate various views of a part of the rear steering device 70 for the rear vehicle unit 12, arranged to be connected to and interact with the load-carrying frame 40, according to the present invention.

The rear steering device 70 is journaled to said rear centre beam 32. The rear steering device 70 is pivotally journaled at said rear centre beam 32. The rear steering device 70 is journaled to said load-carrying frame 40. The rear steering device 70 is pivotally journaled at said load-carrying frame 40.

The rear steering device 70 comprises a rear steering bearing configuration 72 for pivoting the rear vehicle unit 12 relative to the load-carrying frame 40 about an axis running substantially orthogonal to the longitudinal and lateral extensions of the rear vehicle unit 12. The rear steering bearing configuration 72 comprises said rear vertical steering link 72.

Said rear steering bearing configuration 72 is annularly configured. Said rear steering bearing configuration 72 comprises an outer bearing ring 72a arranged to be attached to said rear centre beam 32. In this alternative, said outer bearing ring 72a is arranged to be attached to the upper side of said rear centre beam 32. In this alternative, said outer bearing ring 72a is arranged to be attached to said rear centre beam 32, such that its centre axis is oriented substantially centrally relative to the longitudinal extension of the track assembly pair 20 of the rear vehicle unit 12. Said outer bearing ring 72a is arranged to be attached to said rear centre beam 32 by means of fastening members 75, wherein said fastening members, in an alternative, are constituted by screw connection(s) and/or rivet connection(s) and/or bolt connection(s).

Said rear steering bearing configuration 72 comprises an inner bearing ring 72b arranged inside said outer bearing ring 72a. Said inner bearing ring 72b is pivotally arranged relative to said outer bearing ring 72a via a sealing-provided bearing 73 for said pivotal bearing. Hence, said inner bearing ring 72b is rotatably arranged relative to said rear centre beam 32 about an axis Y2 that is orthogonal to the longitudinal and lateral extensions of the rear centre beam. Said inner bearing ring 72b is rotatably arranged about a vertical axis Y2.

Said rear vertical steering link 72 is comprised of said inner bearing ring 72b. Hence, said inner bearing ring 72b is rotatable about the axis Y2 of the rear vertical steering link 72.

The rear steering bearing configuration 72 comprises first and second attachment members 77a, 77b, arranged on respective sides of the outer bearing ring 72a, for pivotal attachment of the above mentioned first and second rear steering cylinders 74a, 74b.

Said rear centre beam 32 is configured to receive said rear steering device 70. Said rear centre beam 32 is configured to receive said rear steering bearing configuration of the rear steering device 70.

In this alternative, said inner bearing ring 72b is arranged to be attached at a bearing portion 76 of said rear steering bearing configuration 72 to said inner bearing ring 72b by means of fastening members 78, where said fastening members, in an alternative, are constituted by screw connection(s) and/or rivet connection(s) and/or bolt connection(s).

In this alternative, said inner bearing ring 72b is arranged to be attached, via said bearing portion 76, to the underside of said load-carrying frame 40. In this alternative, said inner bearing ring 72b is arranged to be attached to said load-carrying frame 40, such that its centre axis Y2 is oriented substantially centrally relative to the longitudinal extension of the track assembly pair 20 of the rear vehicle unit 12. Said inner bearing ring 72b is arranged to be attached to said load-carrying frame 40 by means of fastening members, where said fastening members, in an alternative, are constituted by screw connection(s) and/or rivet connection(s) and/or bolt connection(s).

Figure 9A:
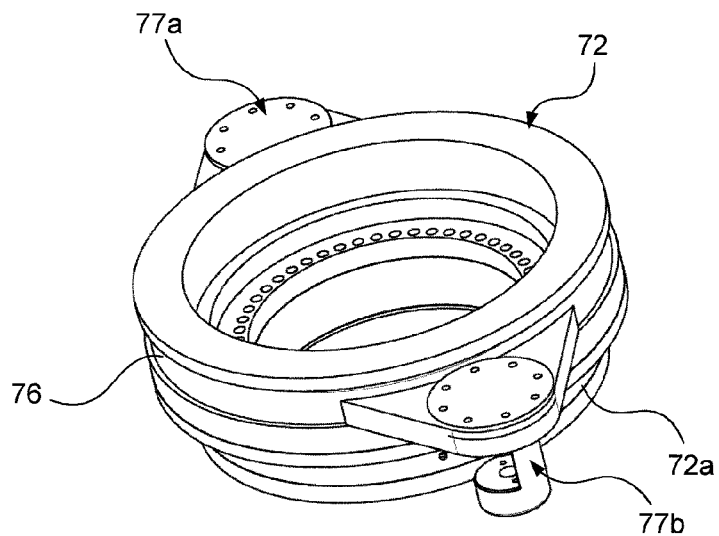
FIG. 9a schematically illustrates a perspective view of a part of a steering device for the rear vehicle unit arranged to be connected to and interact with the load-carrying frame of the present invention.
Figure 9B:
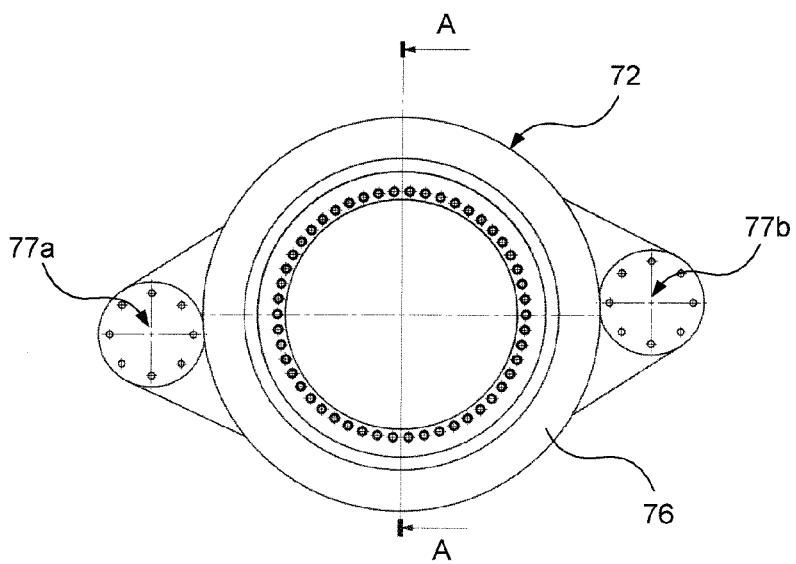
Figure 9C:
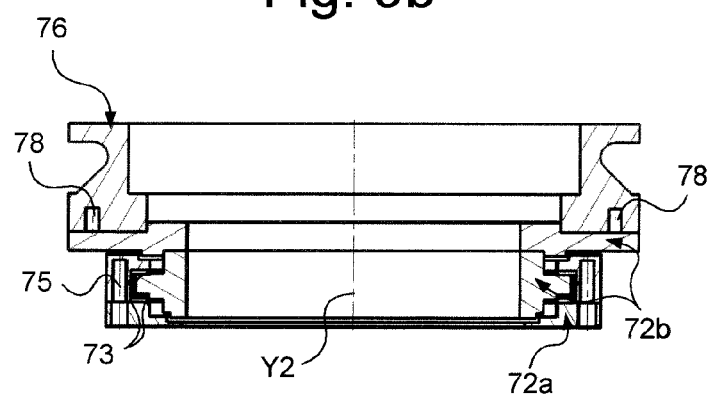
FIG. 9c schematically illustrates a cross section of the steering device shown in FIG. 8b.

In an embodiment, the respective further steering device, such as the further steering device 170 of the further vehicle unit 13, is formed in accordance with the rear steering device 70 for the rear vehicle unit 12 comprising said rear steering bearing configuration 72 as described above by reference to inter alia FIG. 9a-c.

In an embodiment, the respective roll steering device, such as the further roll steering device 160, is formed in accordance with the roll bearing configuration 62 for the front vehicle unit 11 as described above by reference to inter alia FIG. 8a-c.

Figure 10:
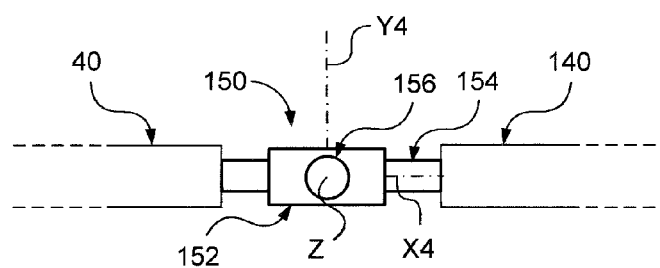
FIG. 10 schematically illustrates a steering device for connecting load-carrying frames, in an embodiment of the present invention.

FIG. 10 schematically illustrates a steering device 150 for connecting load-carrying frames, according to an embodiment of the present invention.

In this embodiment of said articulated vehicle, said connection between said further load-carrying frame 140 and said load-carrying frame 40 is pivotable in vertical link about a vertical steering link 152 comprised of the steering device 150, such that said load-carrying frame 40 and the further load-carrying frame 140 is allowed to pivot relative to each other about the axis Y4 of said vertical steering link.

Hereby, thus, the load-carrying frame 40 is configured for pivotal attachment to said further load-carrying frame 140 via said vertical steering link 152 to enable pivoting of said load-carrying frame 40 and said further load-carrying frame 140 relative to each other about the axis Y4 of said vertical steering link 152.

This improves the manoeuvrability of the vehicle, in that the load-carrying frames are allowed to pivot relative to each other in vertical link. In an alternative, said vertical steering link 152 is lockable, such that the load-carrying frames can be locked to prevent pivoting in vertical link when the load-carrying frames are aligned with each other.

In this embodiment of said articulated vehicle, said connection between said further load-carrying frame 140 and said load-carrying frame 40 is, in accordance with the previous embodiment, rotatable in rolling link about a frame rolling link 154 comprised of the steering device 150, such that said load-carrying frame 40 and the further load-carrying frame 140 are allowed to rotate relative to each other about the axis X4 of said frame rolling link. This improves the manoeuvrability of the vehicle, in that the load-carrying frames are allowed to rotate relative to each other in rolling link. In an alternative, said frame rolling link 154 is lockable, such that the load-carrying frames can be locked to prevent rotation in rolling link when the load-carrying frames are aligned with each other.

In this embodiment of said articulated vehicle, said connection between said further load-carrying frame and said load-carrying frame is pivotable in tipping link about one transverse tipping steering link 156 comprised of the steering device 150, such that said first and further load-carrying frames are allowed to pivot relative to each other about the axis Z of said tipping steering link 156.

Hereby, thus, the load-carrying frame 40 is configured for pivotal attachment to said further load-carrying frame 140 via said tipping steering link 156 to enable pivoting of said load-carrying frame 40 and said further load-carrying frame 140 relative to each other about the axis Z of said tipping steering link 156.

This improves the manoeuvrability of the vehicle, in that the load-carrying frames are allowed to pivot relative to each other also in tipping link. In an alternative, said tipping steering link 156 is lockable, such that the load-carrying frames can be locked to prevent pivoting in tipping link when the load-carrying frames are aligned with each other.

The invention claimed is:

1. An articulated vehicle comprising:
   a front vehicle unit,
   a rear vehicle unit,
   a further vehicle unit connected to said rear vehicle unit,
   a front vertical steering link arranged substantially centrally of the front vehicle unit, and
   a fixed load-carrying frame disposed on top of the front vehicle unit and the rear vehicle unit so as to connect the front and rear vehicle units,
   wherein said front vertical steering link is configured for pivotal attachment to the fixed load-carrying frame connecting said front and rear vehicle units,
   said further vehicle unit is configured for attachment to a further fixed load-carrying frame,
   said further fixed load-carrying frame is releasably connectable to said fixed load-carrying frame for said connection, such that a train of the vehicle units is formed connected to a load-carrying frame unit comprising said fixed load-carrying frame and said further fixed load-carrying frame.

2. The articulated vehicle of claim 1, wherein said fixed load-carrying frame is connected via a rear portion to a front portion of said further fixed load-carrying frame.

3. The articulated vehicle of claim 1, wherein said front vertical steering link is arranged to enable pivoting of said front vehicle unit relative to said fixed load-carrying frame, said rear vehicle unit and said further vehicle unit.

4. The articulated vehicle of claim 1, wherein the fixed load-carrying frame is configured for pivotal attachment to a rear vertical steering link arranged centrally of said rear vehicle unit to enable pivoting of said rear vehicle unit relative to said fixed load-carrying frame, said front vehicle unit and said further vehicle unit.

5. The articulated vehicle of claim 1, wherein the further fixed load-carrying frame is configured for pivotal attachment to a further vertical steering link arranged centrally of said further vehicle unit to enable pivoting of said further vehicle unit relative to said fixed load-carrying frame and said front and rear vehicle units.

6. The articulated vehicle of claim 1, wherein the fixed load-carrying frame is configured for rotatable attachment to a rolling link arranged at said front vehicle unit to enable rotation of said front vehicle unit relative to said fixed load-carrying frame, said further fixed load-carrying frame, said rear vehicle unit and said further vehicle unit about an axis of said rolling link running in an axial main extension direction of the frame unit.

7. The articulated vehicle of claim 1, wherein the fixed load-carrying frame is configured for pivotal attachment to said further fixed load-carrying frame via a frame rolling link comprising said connection to enable pivoting of said fixed load-carrying frame and said further fixed load-carrying frame relative to each other about an axis of said frame rolling link running in an axial main extension direction of the frame unit.

8. The articulated vehicle of claim 1, where the fixed load-carrying frame unit, in a basic position of the vehicle where a longitudinal extension of the front, the rear and said further vehicle unit are substantially aligned with each other, is arranged to run over a rear section of the front vehicle unit and to run substantially over the rear vehicle unit and the further vehicle unit, such that the weight of the load carried by the fixed load-carrying frame is carried centrally of the respective vehicle unit.

9. The articulated vehicle of claim 1, where said connection between said further fixed load-carrying frame and said fixed load-carrying frame is fixed in vertical link, such that said first and further fixed load-carrying frames are not allowed to pivot relative to each other about said vertical link.

10. The articulated vehicle of claim 1, where said connection between said further fixed load-carrying frame and said fixed load-carrying frame is fixed in tipping link, such that said first and further fixed load-carrying frames are not allowed to pivot relative to each other about said tipping link.

11. The articulated vehicle of claim 1, wherein the fixed load-carrying frame is configured for pivotal attachment to said further fixed load-carrying frame via a vertical steering link comprising said connection to enable pivoting of said fixed load-carrying frame and said further fixed load-carrying frame relative to each other about an axis of said vertical steering link.

12. The articulated vehicle of claim 1, wherein the fixed load-carrying frame is configured for pivotal attachment to said further fixed load-carrying frame via a tipping steering link comprising said connection to enable pivoting of said fixed load-carrying frame and said further fixed load-carrying frame relative to each other about an axis of said tipping steering link.

13. The articulated vehicle of claim 1, wherein said train of vehicle units comprises one or more of the further vehicle units following one another.

14. The articulated vehicle of claim 1, where respective further fixed load-carrying frame, connected to a further vehicle unit, is configured in the front end to be connected to a rear end of the fixed load-carrying frame of the preceding vehicle unit and in the rear end to a front end of the further fixed load-carrying frame of the succeeding vehicle unit.

15. The articulated tracked vehicle of claim 1, wherein the front vehicle unit comprises a front track assembly pair, wherein the front vertical steering link is arranged between the respective track assemblies of the front track assembly pair and substantially centrally arranged relative to the longitudinal extension of the front track assembly pair, such that the weight of the load carried by the fixed load-carrying frame is distributed to be carried centrally of said track assembly pair of said front vehicle unit; and wherein the rear vehicle unit comprises a rear track assembly pair, wherein the rear vertical steering link is arranged between the respective track assemblies of the rear track assembly pair and substantially centrally arranged relative to the longitudinal extension of the rear track assembly pair, such that the weight of the load carried by the fixed load-carrying frame is distributed to be carried centrally of said track assembly pair of said rear vehicle unit; and wherein respective further vehicle unit comprises a further track assembly pair, wherein the respective further vertical steering link is arranged between the respective track assemblies of the further track assembly pair and substantially centrally arranged relative to the longitudinal extension of the further track assembly pair, such that the weight of the load carried by the respective further fixed load-carrying frame is distributed to be carried centrally of said track assembly pair of the respective further vehicle unit.

16. The articulated vehicle of claim 1, wherein the further fixed load-carrying frame of a further vehicle unit, in a basic position where the further fixed load-carrying frame runs in the longitudinal extension of the further vehicle unit, is arranged to, by a front portion, protrude beyond the front end of a track assembly pair of the further vehicle unit and to, by a rear portion, protrude beyond the rear end of the track assembly pair.

17. The articulated tracked vehicle of claim 1, where said vehicle is a diesel electric vehicle.

* * * * *